United States Patent
Khodadadeh et al.

(10) Patent No.: US 12,321,495 B2
(45) Date of Patent: Jun. 3, 2025

(54) ANONYMIZING DIGITAL IMAGES UTILIZING A GENERATIVE ADVERSARIAL NEURAL NETWORK

(71) Applicant: Adobe Inc., San Jose, CA (US)

(72) Inventors: Siavash Khodadadeh, Mountain View, CA (US); Ratheesh Kalarot, San Jose, CA (US); Shabnam Ghadar, Menlo Park, CA (US); Yannick Hold-Geoffroy, San Jose, CA (US)

(73) Assignee: Adobe Inc., San Jose, CA (US)

( * ) Notice: Subject to any disclaimer, the term of this patent is extended or adjusted under 35 U.S.C. 154(b) by 271 days.

(21) Appl. No.: 18/052,121

(22) Filed: Nov. 2, 2022

(65) Prior Publication Data
US 2024/0143835 A1 May 2, 2024

(51) Int. Cl.
*G06F 21/62* (2013.01)
*G06N 3/0455* (2023.01)
*G06N 3/0475* (2023.01)

(52) U.S. Cl.
CPC ....... *G06F 21/6254* (2013.01); *G06N 3/0455* (2023.01); *G06N 3/0475* (2023.01)

(58) Field of Classification Search
None
See application file for complete search history.

(56) References Cited

U.S. PATENT DOCUMENTS 11,580,673 B1 * 2/2023 Ren .................. G06N 3/0464
2020/0218883 A1 * 7/2020 Wang ................ G06F 18/2178
2022/0147769 A1 * 5/2022 Tran ..................... G06V 10/82
2022/0334637 A1 * 10/2022 Sharma .................. G06N 3/08
2023/0351662 A1 * 11/2023 Sinha ..................... G10L 21/10
2024/0129435 A1 * 4/2024 Cazzani ................... G06T 7/10

FOREIGN PATENT DOCUMENTS

WO WO-2022110638 A1 * 6/2022 ............ G06N 3/045
WO WO-2023234882 A1 * 12/2023
WO WO-2023247732 A1 * 12/2023 .......... G06N 3/0454

OTHER PUBLICATIONS

Deepfakes. https://github.com/deepfakes/faceswap. Accessed: May 23, 2017.

(Continued)

*Primary Examiner* — Younes Naji
(74) *Attorney, Agent, or Firm* — Keller Preece PLLC

(57) ABSTRACT

The present disclosure relates to systems, methods, and non-transitory computer readable media for generating anonymized digital images utilizing a face anonymization neural network. In some embodiments, the disclosed systems utilize a face anonymization neural network to extract or encode a face anonymization guide that encodes face attribute features, such as gender, ethnicity, age, and expression. In some cases, the disclosed systems utilize the face anonymization guide to inform the face anonymization neural network in generating synthetic face pixels for anonymizing a digital image while retaining attributes, such as gender, ethnicity, age, and expression. The disclosed systems learn parameters for a face anonymization neural network for preserving face attributes, accounting for multiple faces in digital images, and generating synthetic face pixels for faces in profile poses.

20 Claims, 14 Drawing Sheets

(56) References Cited

OTHER PUBLICATIONS

Hukkelas, H., Mester, R., and Lindseth, F. Deepprivacy: A generative adversarial network for face anonymization. In Int'l symposium on visual computing, 2019.

Kafri, O., Patashnik, O., Alaluf, Y., and Cohen-Or, D. Stylefusion: A generative model for disentangling spatial segments. arXiv preprint arXiv:2107.07437, 2021.

Karras, T., Laine, S., Aittala, M., Hellsten, J., Lehtinen, J., and Aila, T. Analyzing and improving the image quality of StyleGAN. In Proc. CVPR, 2020.

Kemelmacher-Shlizerman, I. Transfiguring portraits. ACM Transactions on Graphics (TOG), 2016.

Maximov, M., Elezi, I., and Leal-Taixe, L. Ciagan: Conditional identity anonymization generative adversarial networks. In Proc. of the IEEE/CVF Conf. on Computer Vision and Pattern Recognition (CVPR), 2020.

Naruniec, J., Helminger, L., Schroers, C., and Weber, R. M. High-resolution neural face swapping for visual effects. In Computer Graphics Forum, 2020.

Yang, F., Wang, J., Shechtman, E., Bourdev, L., and Metaxas, D. Expression flow for 3d-aware face component transfer. In ACM SIGGRAPH 2011 papers. 2011.

Zhao, S., Cui, J., Sheng, Y., Dong, Y., Liang, X., Chang, E. I., and Xu, Y. Large scale image completion via co-modulated generative adversarial networks. arXiv preprint arXiv:2103.10428, 2021.

\* cited by examiner

ANONYMIZING DIGITAL IMAGES UTILIZING A GENERATIVE ADVERSARIAL NEURAL NETWORK

BACKGROUND

In the field of digital image editing, deep generative models have become increasingly effective in various applications, such as producing realistic images from randomly sampled seeds or image inpainting. These models, such as generative adversarial networks ("GANs"), have revolutionized digital image synthesis, enabling digital image modifications by extracting and combining features across digital images. Indeed, GANs have made significant progress in generating or synthesizing pixels for filling holes in, or replacing original pixels, of a digital image. Despite the advances of conventional digital image systems that utilize these models, however, these conventional systems continue to suffer from a number of disadvantages, such as accuracy in inpainting digital images over regions of pixels that share a semantic label but depict different object instances.

SUMMARY

This disclosure describes one or more embodiments of systems, methods, and non-transitory computer readable media that solve one or more of the foregoing or other problems in the art by anonymizing digital images utilizing a face anonymization neural network based on a generative adversarial architecture. For example, the disclosed systems utilize a generative adversarial neural network to generate a face anonymization guide from a digital image, where the face anonymization guide informs the synthesis of face pixels while retaining facial attributes pertaining to gender, ethnicity, age, and/or expression. In some embodiments, based on the face anonymization guide, the disclosed systems further generate an anonymized digital image that anonymizes (or removes the likeness or identify of) faces depicted in the digital image, preserving the gender, ethnicity, age, and/or expression of the faces.

BRIEF DESCRIPTION OF THE DRAWINGS

This disclosure describes one or more embodiments of the invention with additional specificity and detail by referencing the accompanying figures. The following paragraphs briefly describe those figures, in which.

DETAILED DESCRIPTION

Figure 1:
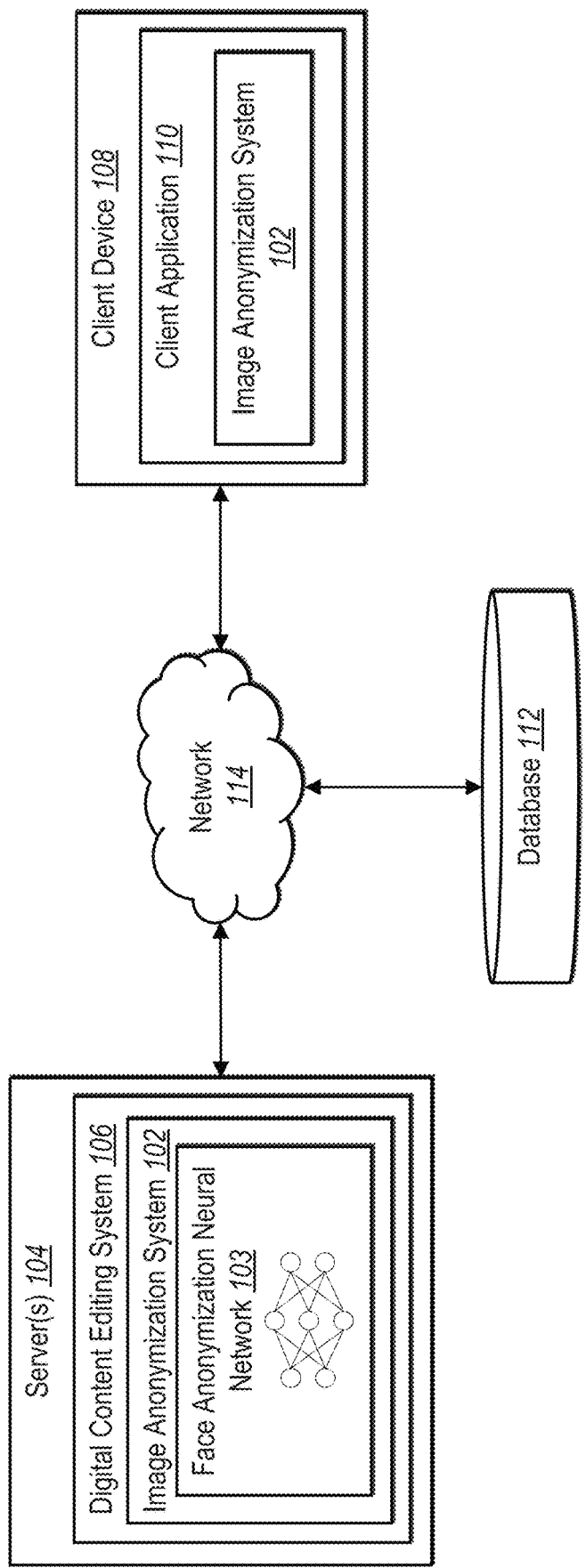
FIG. 1 illustrates an example system environment in which an image anonymization system operates in accordance with one or more embodiments.

This disclosure describes one or more embodiments of an image anonymization system that generates anonymized digital images by synthesizing face pixels according to a face anonymization guide. For example, the image anonymization system generates or encodes a face anonymization guide from a digital image depicting faces of one or more people utilizing a specialized generative adversarial neural network (e.g., a face anonymization neural network). In some embodiments, the image anonymization system encodes the face anonymization guide to encode features of a face, such as gender-related features, ethnicity-related features, age-related features, and/or expression-related features. Additionally, in one or more embodiments, the image anonymization system utilizes the specialized generative adversarial neural network (e.g., the face anonymization neural network) to generate synthetic face pixels to replace face pixels initially presented in a digital image. For instance, the image anonymization system generates synthetic face pixels as guided or informed by the face anonymization guide to preserve or retain face attributes, including gender, ethnicity, age, and/or expression.

As just mentioned, in one or more embodiments, the image anonymization system generates or encodes a face anonymization guide from a digital image. For example, the image anonymization system utilizes one or more encoders of a face anonymization neural network (e.g., a specialized generative adversarial neural network) to extract or encode features from a digital image depicting a face of a person (or multiple faces of multiple people). In some embodiments, the image anonymization system utilizes a first encoder to extract face attribute features relating to salient features, including features indicative of a gender of the depicted face, features indicative of an ethnicity of the depicted face, features indicative of an age of the depicted face, and/or features indicative of a facial expression of the depicted face (e.g., a smile or a scowl). In these or other embodiments, the image anonymization system utilizes a second encoder to extract additional face attributes relating to image texture and/or other observable or unobservable image attributes. Additionally, in one or more embodiments, the image anonymization system combines the face attribute features extracted via the first encoder and the additional face attribute features extracted via the second encoder into a face anonymization guide.

As also mentioned, in some embodiments, the image anonymization system utilizes the face anonymization guide to generate an anonymized digital image. For instance, the image anonymization system utilizes the face anonymization guide to guide the inpainting, or replacement, of face pixels originally depicted within a digital image. In some cases, the image anonymization system utilizes a specialized generative adversarial neural network to synthesize face pixels for replacing the initial face pixels of the digital image as guided by the face anonymization guide.

For example, the face anonymization guide masks initial face pixels depicted in the digital image to generate a masked digital image. In certain embodiments, the image anonymization system further extracts a masked image vector from the masked digital image utilizing an encoder of the generative adversarial neural network. In some embodiments, the image anonymization system also combines the masked image vector with the face anonymization guide to generate a combined image mask-feature guide vector for guiding the process of filling or inpainting the masked face pixels. Indeed, to fill or replace the masked face pixels, in some cases, the image anonymization system utilizes a synthesizer (e.g., a decoder) of the generative adversarial neural network to generate synthetic face pixels from the combined image mask-feature guide vector. Accordingly, in certain embodiments, the image anonymization system generates an anonymized digital image with synthetic face pixels that replace original face pixels while retaining attributes, such as gender, ethnicity, age, and expression.

As suggested above, many conventional digital image systems exhibit a number of shortcomings or disadvantages, particularly in accuracy and flexibility in generating digital images. For example, in the field of digital image editing, some existing systems inaccurately anonymize faces in digital images. Specifically, existing systems often generate face pixels using preselected face pairs and/or using face landmarks (e.g., left/right eyes, left/right ears, nose, etc.) to condition the generation of face pixels. However, using preselected face pairs often results in swapping or blending face pixels with those of another image rather than truly anonymizing the image with synthetic face pixels. Additionally, using face landmarks may result in a similar facial structure for a generated digital image, but other attributes such as gender, ethnicity, age, and expression are not calibrated in such systems. Accordingly, many existing systems generate digital images that either fail to truly anonymize faces and/or that fail to preserve salient facial features, sometimes resulting in images that are unrealistic and visually jarring.

As a contributing factor to their inaccuracies, some existing digital image systems are inflexible. More specifically, as suggested above, prior systems are sometimes rigidly fixed to swapping face pixels from preselected face pairs. Because of their reliance on preselected faces, such systems cannot adapt to anonymize digital images freely but instead require (manual) curation of face pairs to use as a basis for swapping face pixels. Consequently, these existing systems are fixed to swapping or blending pixels of preselected faces and cannot generate synthetic face pixels for anonymizing a digital image with pixels that did not originate from a digital image (or from a captured face of a person).

In solving one or more of the aforementioned shortcomings of prior systems, embodiments of the image anonymization system provide a variety of improvements or advantages over conventional digital image systems. For example, embodiments of the image anonymization system introduce a new functionality not found in prior systems. To elaborate, unlike prior systems that are limited to face swapping/blending or landmark-based anonymization, the image anonymization system performs digital image anonymization while keeping gender, ethnicity, age, and expression of an originally depicted face, something prior systems cannot do. Indeed, the image anonymization system utilizes a face anonymization neural network to inpaint a face within a digital image according to a face anonymization guide.

Due at least in part to introducing a face anonymization guide, in some embodiments, the image anonymization system improves accuracy over conventional systems. Indeed, while prior systems swap or blend pixels of existing faces or generate pixels without consideration for gender, ethnicity, age, or expression (which often results in strange images with mixed ethnicities, genders, ages, and expressions on a single face), the image anonymization system utilizes a face anonymization neural network that utilizes a face anonymization guide map to accurately generate anonymized digital images while preserving gender, ethnicity, age, and expression. For example, the image anonymization system generates and inpaints synthetic face pixels to retain salient face features that were originally depicted in, and extracted from, an initial digital image.

As another example of improved accuracy, in some embodiments, the image anonymization system more accurately accounts for overlapping faces in a digital image. To elaborate, some prior systems cannot account for circumstances where face pixels of two separate faces overlap within a digital image, and these systems often treat the overlapping face pixels as a single face which can ultimately produce strange images with misshapen faces. By contrast, in some embodiment, the image anonymization system utilizes a smart masking technique or algorithm to identify and separate multiple overlapping faces in a digital image. For instance, the image anonymization system removes pixels of additional faces within a boundary around a particular face and masks only the remaining pixels of the particular face as a target region for inpainting.

As yet another example of improved accuracy, in certain embodiments, the image anonymization system is more capable of anonymizing digital images depicting faces in non-frontal poses. Many prior systems inaccurately generate anonymized faces in profile views (or other non-frontal views) due to a lack of training data for such images. To correct these deficiencies, the image anonymization system generates a customized dataset by modifying the yaw of faces depicted in sample digital images. Utilizing custom sample images, the image anonymization system trains a face anonymization neural network to accurately generate synthetic face pixels for faces in profile poses or other non-frontal poses.

In addition to improving accuracy, in some embodiments, the image anonymization system improves flexibility over conventional digital image systems. For example, as opposed to conventional systems that are rigidly fixed to swapping or blending pixels of predetermined face pairs, the image anonymization system is adaptable to inpaint faces in digital images by generating face pixels that are entirely synthetic (e.g., not originating from a digital image). In some cases, the image anonymization system not only generates face pixels but also adapts the synthetic face pixels to match face attributes, such as gender, ethnicity, age, and expression of a face initially depicted in a digital image.

Thus, in some embodiments, the image anonymization system flexibly accommodates different face attributes by generating synthetic pixels for anonymizing a digital image adapted to different genders, ethnicities, ages, and expressions.

Additional detail regarding the image anonymization system will now be provided with reference to the figures. For example, FIG. 1 illustrates a schematic diagram of an example system environment for implementing an image anonymization system 102 in accordance with one or more embodiments. An overview of the image anonymization system 102 is described in relation to FIG. 1. Thereafter, a more detailed description of the components and processes of the image anonymization system 102 is provided in relation to the subsequent figures.

As shown, the environment includes server(s) 104, a client device 108, a database 112, and a network 114. Each of the components of the environment communicate via the network 114, and the network 114 is any suitable network over which computing devices communicate. Example networks are discussed in more detail below in relation to FIG. 14.

As mentioned, the environment includes a client device 108. The client device 108 is one of a variety of computing devices, including a smartphone, a tablet, a smart television, a desktop computer, a laptop computer, a virtual reality device, an augmented reality device, or another computing device as described in relation to FIG. 14. The client device 108 communicates with the server(s) 104 via the network 114. For example, the client device 108 provides information to server(s) 104 indicating client device interactions (e.g., digital image selections, face anonymization requests, or other input) and receive information from the server(s) 104 such as anonymized digital images. Thus, in some cases, the image anonymization system 102 on the server(s) 104 provides and receives information based on client device interaction via the client device 108.

As shown in FIG. 1, the client device 108 includes a client application 110. In particular, the client application 110 is a web application, a native application installed on the client device 108 (e.g., a mobile application, a desktop application, etc.), or a cloud-based application where all or part of the functionality is performed by the server(s) 104. Based on instructions from the client application 110, the client device 108 presents or displays information to a user, including digital images such as initial (e.g., captured, uploaded, or un-modified) digital images, anonymized digital images, and/or selectable options for anonymizing digital images. In some cases, the client application 110 includes all or part of the image anonymization system 102 and/or the face anonymization neural network 103.

As illustrated in FIG. 1, the environment includes the server(s) 104. The server(s) 104 generates, tracks, stores, processes, receives, and transmits electronic data, such as image anonymization inputs, digital images, and/or anonymized digital images. For example, the server(s) 104 receives data from the client device 108 in the form of an indication of a client device interaction to anonymize a digital image. In response, the server(s) 104 transmits data to the client device 108 to cause the client device 108 to display or present an anonymized digital image based on the client device interaction.

In some embodiments, the server(s) 104 communicates with the client device 108 to transmit and/or receive data via the network 114, including client device interactions, image anonymization requests, digital images, and/or other data. In some embodiments, the server(s) 104 comprises a distributed server where the server(s) 104 includes a number of server devices distributed across the network 114 and located in different physical locations. The server(s) 104 comprise a content server, an application server, a communication server, a web-hosting server, a multidimensional server, a container orchestration server, or a machine learning server. The server(s) 104 further access and utilize the database 112 to store and retrieve information such as stored digital images, anonymized digital images, masked digital images, and/or other data.

As further shown in FIG. 1, the server(s) 104 also includes the image anonymization system 102 as part of a digital content editing system 106. For example, in one or more implementations, the digital content editing system 106 is able to store, generate, modify, edit, enhance, provide, distribute, and/or share digital content, such as anonymized digital images. For example, the digital content editing system 106 provides tools for the client device 108, via the client application 110, to generate anonymized digital images utilizing the face anonymization neural network 103.

In one or more embodiments, the server(s) 104 includes all, or a portion of, the image anonymization system 102. For example, the image anonymization system 102 operates on the server(s) to generate and provide anonymized digital images. In some cases, the image anonymization system 102 utilizes, locally on the server(s) 104 or from another network location (e.g., the database 112), a face anonymization neural network 103 to generate anonymized digital images. In addition, the image anonymization system 102 includes or communicates with a face anonymization neural network 103 (and/or a semantic discriminator for training).

In certain cases, the client device 108 includes all or part of the image anonymization system 102. For example, the client device 108 generates, obtains (e.g., downloads), or utilizes one or more aspects of the image anonymization system 102 from the server(s) 104. Indeed, in some implementations, as illustrated in FIG. 1, the image anonymization system 102 is located in whole or in part on the client device 108. For example, the image anonymization system 102 includes a web hosting application that allows the client device 108 to interact with the server(s) 104. To illustrate, in one or more implementations, the client device 108 accesses a web page supported and/or hosted by the server(s) 104.

In one or more embodiments, the client device 108 and the server(s) 104 work together to implement the image anonymization system 102. For example, in some embodiments, the server(s) 104 train one or more neural networks discussed herein and provide the one or more neural networks to the client device 108 for implementation. In some embodiments, the server(s) 104 train one or more neural networks, the client device 108 request image anonymization, the server(s) 104 generate anonymized digital images utilizing the one or more neural networks. Furthermore, in some implementations, the client device 108 assists in training one or more neural networks.

Although FIG. 1 illustrates a particular arrangement of the environment, in some embodiments, the environment has a different arrangement of components and/or may have a different number or set of components altogether. For instance, as mentioned, the image anonymization system 102 is implemented by (e.g., located entirely or in part on) the client device 108. In addition, in one or more embodiments, the client device 108 communicates directly with the image anonymization system 102, bypassing the network 114. Further, in some embodiments, the face anonymization neural network 103 includes one or more components stored in the database 112, maintained by the server(s) 104, the client device 108, or a third-party device.

Figure 2:
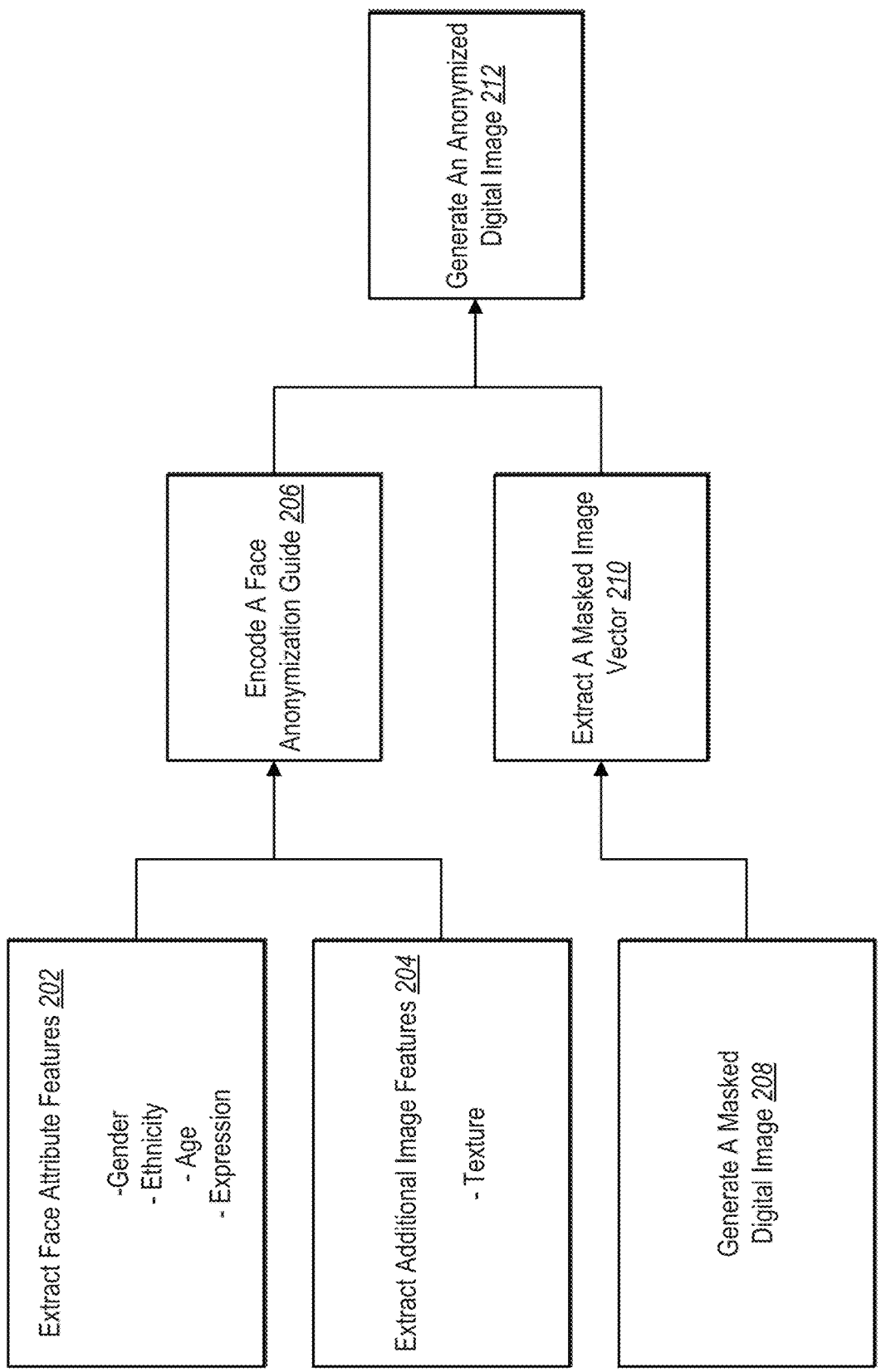
FIG. 2 illustrates an overview of generating an anonymized digital image utilizing a face anonymization neural network in accordance with one or more embodiments.

As mentioned, in one or more embodiments, the image anonymization system 102 generates an anonymized digital image. In particular, the image anonymization system 102 generates an anonymized digital image utilizing a specialized generative adversarial neural network—a face anonymization neural network—to synthesize face pixels according to a face anonymization guide. FIG. 2 illustrates an example overview of generating an anonymized digital image utilizing the face anonymization neural network in accordance with one or more embodiments. Additional detail regarding the various acts illustrated in FIG. 2 is provided thereafter with reference to subsequent figures.

As illustrated in FIG. 2, in one or more embodiments, the image anonymization system 102 performs an act 202 to extract face attribute features. To elaborate, the image anonymization system 102 utilizes an encoder neural network (e.g., as part of a face anonymization neural network) to extract face attribute features from a digital image depicting a face of a person (or multiple faces of multiple people), where the face attribute feature represents one or more of: gender, ethnicity, age, or expression. In one or more embodiments, a neural network refers to a machine learning model that can be trained and/or tuned based on inputs to generate predictions, determine classifications, or approximate unknown functions. For example, a neural network includes a model of interconnected artificial neurons (e.g., organized in layers) that communicate and learn to approximate complex functions and generate outputs (e.g., generated digital images) based on a plurality of inputs provided to the neural network. In some cases, a neural network refers to an algorithm (or set of algorithms) that implements deep learning techniques to model high-level abstractions in data. For example, a neural network can include a convolutional neural network, a recurrent neural network (e.g., an LSTM), a graph neural network, or a generative adversarial neural network.

Along these lines, in some embodiments, a face anonymization neural network includes a neural network that generates an anonymized digital image based on a face anonymization guide. For example, a face anonymization neural network refers to a generative adversarial neural network that inpaints or replaces face pixels of a digital image with synthetic face pixels as dictated by a face anonymization guide that encodes face attributes, such as gender, ethnicity, age, and expression. In some cases, a generative adversarial neural network ("GAN") refers to a neural network that is tuned or trained via an adversarial process to generate an output digital image from an input such as a noise vector.

For example, a generative adversarial neural network includes multiple constituent neural networks such as one or more encoder neural networks and one or more generator (or decoder) neural networks. For example, an encoder neural network extracts latent code from a noise vector or from a digital image. A generator neural network (or a combination of generator neural networks) generates a modified digital image by combining or otherwise processing extracted latent code (e.g., from the encoder neural network(s)). During training, a discriminator neural network, in competition with the generator neural network, analyzes a generated digital image to generate a realism prediction by determining whether the generated digital image is real (e.g., from a set of stored digital images) or fake (e.g., not from the set of stored digital images). Using one or more loss functions, the discriminator neural network also informs modification of parameters of encoder neural network(s), generator neural network(s), and/or the discriminator neural network to eventually generate digital images that fool the discriminator neural network into indicating that a generated digital image is a real digital image.

Relatedly, in some embodiments, a face anonymization neural network—which is a specialized version of a generative adversarial neural network—includes a face attribute encoder, a texture encoder, a masked image encoder, and a synthesizer. In some cases, a face attribute encoder is an encoder neural network that encodes or extracts face attribute features for a face depicted within a digital image to represent face attributes of the face, such as gender, ethnicity, age, and expression as a feature vector. In one or more embodiments, a texture encoder is an encoder neural network that encodes or extracts additional features for a face depicted within a digital image, including texture features, color features, lighting features, and/or other observable or unobservable pixel features. Along similar lines, a masked image encoder is an encoder neural network that encodes or extracts features for a masked digital image (e.g., a digital image where a face is masked by a binary mask that removes or obfuscates face pixels) to generate a masked image vector. Additionally, a synthesizer is a generator neural network (or a decoder neural network) that generates or synthesizes synthetic face pixels (e.g., face pixels that are not originally present in the digital or image and that do not originate from another digital image) based on one or more feature vectors extracted by encoder neural network(s).

In one or more embodiments, a feature refers to digital information describing all or part of a digital image. For example, features are represented as vectors, tensors, or codes that encoder neural networks extract or generate. In some cases, features include observable characteristics or observable information pertaining to a digital image such as a color or a geometric layout. In other cases, features include latent features (e.g., features within the various layers of a neural network and that may change as they are passed from layer to layer) and/or unobservable deep features. In some embodiments, face attribute features include features representing, indicating, or encoding face attributes such as gender, ethnicity, age, and expression of a face depicted in a digital image. In these or other embodiments, texture features include features representing, indicating, or encoding texture features (or other pixel features) of a digital image. In certain embodiments, a guide feature set includes a combination of features extracted from different encoders to form a face anonymization guide. For instance, a guide feature set (or a face anonymization guide) includes face attribute features and texture features.

As further illustrated in FIG. 2, the image anonymization system 102 performs an act 204 to extract additional image features from the digital image. To elaborate, the image anonymization system 102 utilizes an encoder (e.g., as part of a face anonymization neural network) in addition to the face attribute encoder to encode additional image features. For instance, the image anonymization system 102 utilizes a texture encoder to encode texture features and/or other observable or unobservable features associated with pixels of a digital image (specifically, face pixels).

Additionally, the image anonymization system 102 performs an act 206 to encode a face anonymization guide. More specifically, the image anonymization system 102 encodes a face anonymization guide by combining face attribute features and additional features (e.g., texture features) of a digital image. Indeed, the image anonymization system 102 extracts the face attribute features and the additional image features utilizing respective encoders of a face anonymization neural network, and the image anonymization system 102 further utilizes the face anonymization neural network to combine the face attribute features and the additional image features into a face anonymization guide.

As further illustrated in FIG. 2, the image anonymization system 102 performs an act 208 to generate a masked digital image. In particular, the image anonymization system 102 generates a masked digital image by masking face pixels of a face depicted within an initial digital image. For instance, the image anonymization system 102 analyzes the digital image to identify one or more faces within the digital image. Based on identifying a face, the image anonymization system 102 further removes or masks face pixels to generate a masked digital image that lacks or hides the face pixels.

In addition, the image anonymization system 102 performs an act 210 to extract a masked image vector. Specifically, the image anonymization system 102 extracts a masked image vector from the masked digital image. For example, the image anonymization system 102 utilizes another encoder (e.g., as part of the face anonymization neural network) to extract or encode the masked image vector. In some cases, the image anonymization system 102 utilizes a masked image encoder to extract the masked image vector from the masked digital image, where the masked image vector includes features representing or defining the masked digital image.

As further illustrated in FIG. 2, the image anonymization system 102 performs an act 212 to generate an anonymized digital image. More particularly, the image anonymization system 102 generates an anonymized digital image by generating synthetic face pixels to fill the masked face pixels of the masked digital image. Thus, the image anonymization system 102 anonymizes the digital image by generating pixels from scratch without copying or blending pixels originating from another digital image. To generate the synthetic face pixels, the image anonymization system 102 utilizes a synthesizer (e.g., as part of the face anonymization neural network) to process the face anonymization guide and the masked image vector. From the face anonymization guide and the masked image vector, the synthesizer synthesizes or generates synthetic face pixels and produces an anonymized digital image by inpainting the synthetic face pixels to replace the masked face pixels of the masked digital image.

Figure 3:
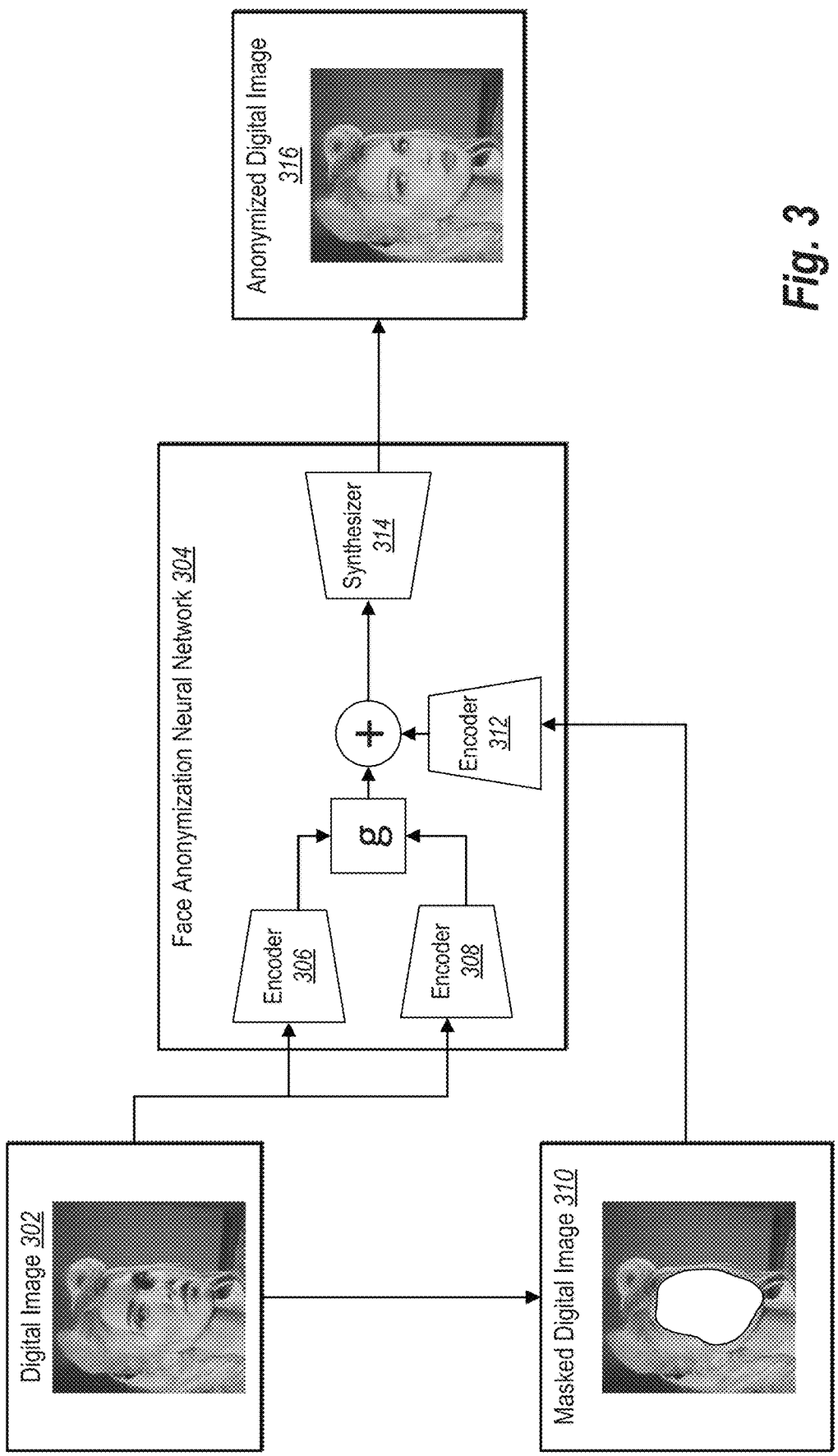
FIG. 3 illustrates an example diagram of an architecture for a face anonymization neural network in accordance with one or more embodiments.

As mentioned above, in certain described embodiments, the image anonymization system 102 generates an anonymized digital image utilizing a face anonymization neural network. In particular, the image anonymization system 102 utilizes a face anonymization neural network that includes constituent components for encoding features and synthesizing face pixels from the encoded features. FIG. 3 illustrates an example architecture for implementation of a face anonymization neural network to generate an anonymized digital image in accordance with one or more embodiments.

As illustrated in FIG. 3, the image anonymization system 102 identifies or receives a digital image 302. In particular, the image anonymization system 102 receives the digital image 302 as an upload or a capture from the client device 108. In some cases, the image anonymization system 102 accesses the digital image 302 from an image repository (e.g., within the database 112) associated with the client device 108 or a particular user account.

Based on identifying or accessing the digital image 302, the image anonymization system 102 further utilizes a face anonymization neural network 304 to generate an anonymized digital image 316 from the digital image 302. To elaborate, the image anonymization system 102 utilizes a first encoder 306 and a second encoder 308 to extract features from the digital image 302 (or from a crop of the digital image 302) to generate a face anonymization guide (represented as g). Indeed, the image anonymization system 102 utilizes the first encoder 306 (e.g., a face attribute encoder) to extract or encode features pertaining to gender, ethnicity, age, and expression. For instance, the image anonymization system 102 extracts a gender feature set, an ethnicity feature set, an age feature set, and an expression feature set and combines one or more of the feature sets into a face attribute feature vector. In some embodiments, the image anonymization system 102 further utilizes the first encoder 306 to extract additional attribute-related features as well.

Additionally, the image anonymization system 102 utilizes the second encoder 308 to extract additional image features, such as texture features, color features, geometric features, lighting features, and/or other features pertaining to the appearance of pixels in the digital image 302. The image anonymization system 102 further utilizes one or more layers of the face anonymization neural network 304 to combine the face attribute feature vector (from the first encoder 306) with the additional feature vector (from the second encoder 308) to generate a face anonymization guide g. By including encoded features representing attributes such as gender, ethnicity, age, and expression, the face anonymization guide informs the synthesis of face pixels for anonymizing the digital image 302 while retaining visual markers or resemblances of those attributes.

As further illustrated in FIG. 3, the image anonymization system 102 generates a masked digital image 310 from the digital image 302. In particular, the image anonymization system 102 generates the masked digital image 310 by masking, removing, excluding, or omitting face pixels of the digital image 302. Indeed, the image anonymization system 102 utilizes a face detection algorithm or an object detection algorithm (e.g., a face detection neural network) to identify or detect the face depicted in the digital image 302. In addition, the image anonymization system 102 removes or masks the face pixels of the digital image 302 to generate the masked digital image that depicts the same pixels as the digital image 302, excluding the face pixels.

In one or more embodiments, the image anonymization system 102 further utilizes a third encoder 312 of the face anonymization neural network 304 to extract or encode a masked image vector from the masked digital image 310. In particular, the image anonymization system 102 extracts features representing colors, a geometric layout, lighting, shapes, landmarks, and/or other attributes of the masked digital image 310 utilizing the third encoder 312 (e.g., a masked image encoder). The image anonymization system 102 thus generates a masked image vector representing the masked digital image 310.

As further illustrated in FIG. 3, the image anonymization system 102 generates the anonymized digital image 316. More specifically, the image anonymization system 102 combines the masked image vector (from the third encoder 312) and the face anonymization guide g to generate a combined image mask-feature guide vector. Indeed, the image anonymization system 102 utilizes one or more layers of the face anonymization neural network 304 to combine (e.g., concatenate) the face anonymization guide and the masked image vector. From the mask-feature guide vector, the image anonymization system 102 generates the anonymized digital image 316 utilizing the synthesizer 314. For instance, the synthesizer 314 decodes the mask-feature guide vector to generate synthetic face pixels to inpaint or replace the masked face pixels of the masked digital image 310.

Figure 4:
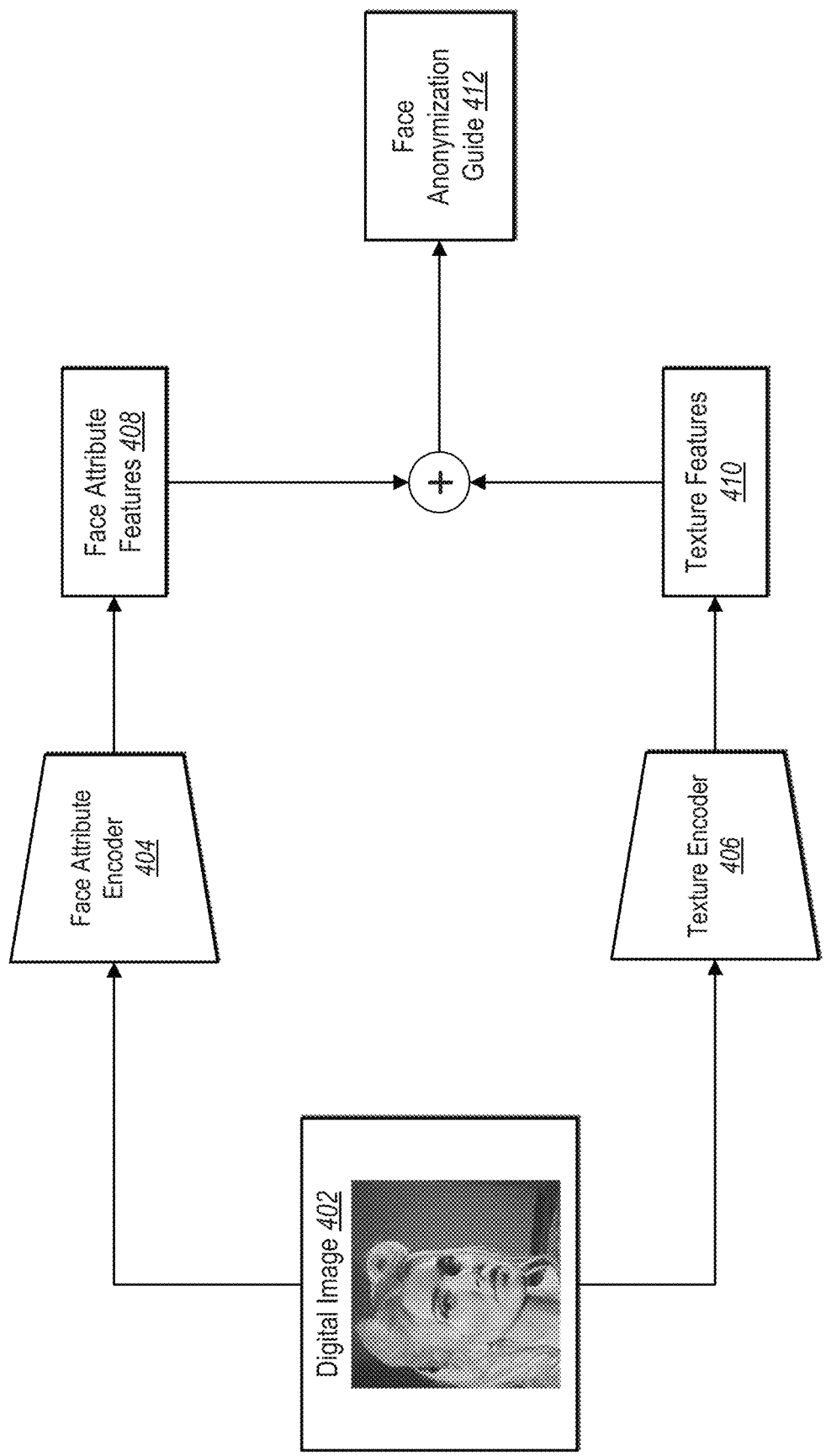
FIG. 4 illustrates an example diagram for generating a face anonymization guide in accordance with one or more embodiments.

As mentioned above, in certain embodiments, the image anonymization system 102 generates a face anonymization guide from a digital image depicting a face of a person. In particular, the image anonymization system 102 utilizes various encoders of a face anonymization neural network to encode a face anonymization guide to preserve certain attributes of the digital image when generating an anonymized digital image, such as gender, ethnicity, age, and expression. FIG. 4 illustrates an example flow diagram for generating a face anonymization guide in accordance with one or more embodiments.

As illustrated in FIG. 4, the image anonymization system 102 utilizes a face attribute encoder 404 and a texture encoder 406 to extract features from a digital image 402. In particular, the face attribute encoder 404 extracts face attribute features 408. For example, the face attribute features 408 include features representing or relating to different genders, different ethnicities (e.g., skin tones), different ages, and/or different expressions of the face depicted in the digital image 402. In one or more embodiments, the face attribute encoder 404 is a hydra encoder that generates hydra features. For example, the face attribute encoder 404 generates or extracts face attribute features 408 with the following labels: "age," "male," "smile," "beard," "moustache," "sideburns," "facial_hair," "no_glasses," "reading_glasses," "sun_glasses," "swimming_goggles," "roll," "yaw," "pitch," "anger," "contempt," "disgust," "fear," "happiness," "neutral," "sadness," "surprise," "bald," "hair_invisible," "white_hair," "gray_hair," "blond_hair," "brown_hair," "red_hair," "black_hair," "eye_makeup," "lip_makeup," "glasses," "headwear," and "tone." In these or other embodiments, the face attribute encoder 404 is a different encoder, such as an encoder described in U.S. patent application Ser. No. 17/182,492 entitled WEB-BASED DIGITAL IMAGE EDITING IN REAL TIME UTILIZING A LATENT VECTOR STREAM RENDERER AND AN IMAGE MODIFICATION NEURAL NETWORK, filed Feb. 23, 2021, which is incorporated herein by reference in its entirety.

In some cases, the face attribute encoder 404 encodes the face attribute features 408 by determining (via the first encoder 306) a value between −1 and 1 (indicating an attribute intensity) for each of a number of face attributes. For instance, the face attribute encoder 403 analyzes the digital image 402 to encode an intensity value for an age attribute, where a lower number indicates a younger age, and a higher number indicates an older age.

In addition, the face attribute encoder 404 encodes the face attribute features 408 to include an intensity value for a male gender attribute, where a lower number indicates more female attributes and a higher number indicates more male attributes. Regarding additional gender-related features, the face attribute encoder 404 encodes values (e.g., from −1 to 1) for a beard attribute, a moustache attribute, a sideburns attribute, a facial hair attribute, an eye makeup attribute, and a lip makeup attribute, where higher values indicate a higher degree of prominence or intensity of the corresponding attributes and lower values indicate a lower degree of prominence or intensity of the attributes as depicted in the digital image 402.

Regarding expression-related features, the face attribute encoder 404 encodes attributes for various facial expressions to indicate prominence or intensity of the various expressions on the face of the digital image 402. For example, the face attribute encoder 404 encodes values (e.g., from −1 to 1) for a smile expression, an angry expression, a contempt expression, a disgust expression, a fear expression, a happiness expression, a neutral expression, a sadness expression, and/or a surprise expression. As suggested, for each of the expression-related features, higher values indicate higher degrees of prominence or intensity of the respective expressions on the face in the digital image 402, while lower values indicate lower degrees of prominence or intensity.

Regarding ethnicity-related features, the face attribute encoder 404 encodes attributes for a skin tone of the face depicted in the digital image 402. In particular, the face attribute encoder 404 encodes values (e.g., from −1 to 1) for a skin tone feature that indicates lightness, darkness, and/or other skin tone qualities. In some cases, higher values indicate lighter skin tones while lower values indicate darker skin tones (or vice-versa).

In one or more embodiments, the face attribute encoder 404 extracts or encodes additional features to include within the face attribute features 408. For example, the face attribute encoder 404 encodes values (e.g., between −1 and 1) for a glasses attribute where higher values indicate more prominent (e.g., thicker, darker, or larger) glasses on a depicted face. Additionally, the face attribute encoder 404 encodes a value for a sunglasses attribute where a higher value indicates more prominent (e.g., darker) lenses for the sunglasses. Further, the face attribute encoder 404 encodes values for a roll attribute, a yaw attribute, and/or a pitch attribute to indicate an orientation, a tilt, or a pose of depicted face in the digital image 402. In some embodiments, the face attribute features 408 include a total of 35 different features for respective face attributes.

As further illustrated in FIG. 4, the image anonymization system 102 utilizes the texture encoder 406 to encode or extract the texture features 410. In particular, the texture encoder 406 encodes image-related features that may or may not be observable to a human observer. For example, the texture encoder 406 encodes image texture features (e.g., features representing a spatial arrangement of colors and/or intensities), image color features, image landmark features, image brightness features, and/or other image features. In some embodiments, the texture features 410 include a total of 32 different features for respective image attributes. In these or other embodiments, the texture encoder 406 is an encoder from an image retrieval model that extracts image features that are specific to face pixels or that are more general for a digital image overall. For example, in some embodiments, the texture encoder 406 is a Stock Face encoder that generates stock face features. In certain embodiments, the texture encoder 406 is a different encoder, such as a style encoder described in U.S. patent application Ser. No. 17/025,041 entitled DETERMINING FINE-GRAIN VISUAL STYLE SIMILARITIES FOR DIGITAL IMAGES BY EXTRACTING STYLE EMBEDDINGS DISENTANGLED FROM IMAGE, filed Sep. 18, 2020, or in U.S. patent application Ser. No. 17/503,671 entitled OBJECT-TO-OBJECT HARMONIZATION FOR DIGITAL IMAGES, filed Oct. 18, 2021, both of which are incorporated herein by reference in their entireties.

In addition, as shown in FIG. 4, the image anonymization system 102 combines the face attribute features 408 and the texture features 410 to form the face anonymization guide 412. To elaborate, the image anonymization system 102 utilizes one or more layers of a face anonymization neural network (e.g., concatenation layers) to concatenate or otherwise combine the face attribute features 408 with the texture features 410. Thus, the image anonymization system 102 generates the face anonymization guide 412 as a guide vector for instructing a decoder/synthesizer of the face anonymization neural network in generating synthetic face pixels that retain attributes corresponding to the encoded features of the face attribute features 408 and the texture features 410.

Figure 5:
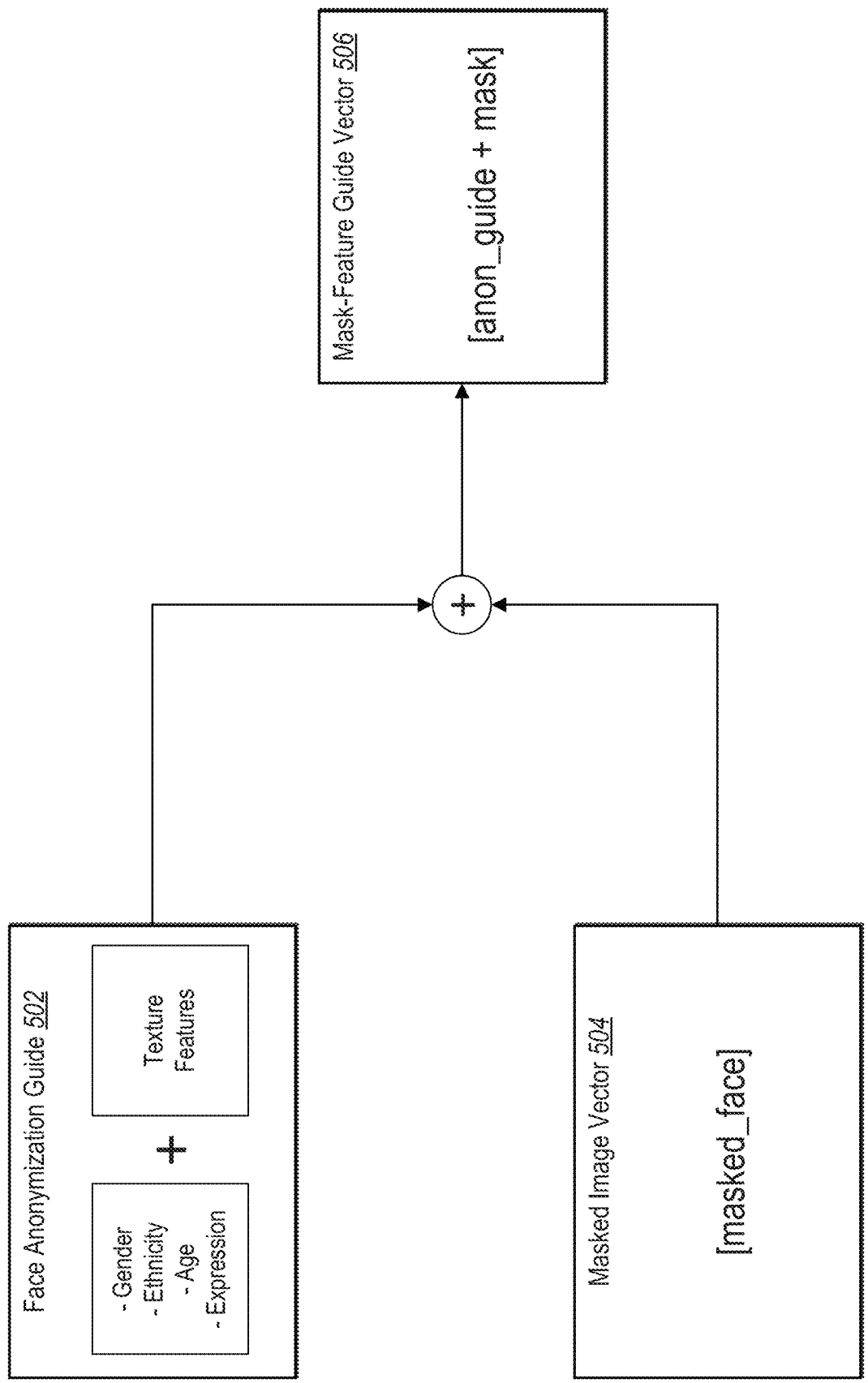
FIG. 5 illustrates an example diagram for generating a mask-feature guide vector in accordance with one or more embodiments.

As mentioned above, in certain embodiments, the image anonymization system 102 generates a mask-feature guide vector for guiding generation of synthetic face pixels. In particular, the image anonymization system 102 generates a mask-feature guide vector by combining a face anonymization guide with a masked image vector. FIG. 5 illustrates an example flow diagram for generating a mask-feature guide vector in accordance with one or more embodiments.

As illustrated in FIG. 5, the image anonymization system 102 determines or generates a face anonymization guide 502. Indeed, as described above, the image anonymization system 102 generates the face anonymization guide 502 by extracting face attribute features (e.g., gender, ethnicity, age, expression, etc.) and texture features and by further combining the face attribute features and the texture features.

In addition, the image anonymization system 102 generates a masked image vector 504. To generate the masked image vector 504, the image anonymization system 102 utilizes a masked image encoder to process a masked digital image (e.g., the masked digital image 310). The image anonymization system 102 utilizes the masked image encoder to encode or generate the masked image vector 504 that includes features representing the masked digital image, including color arrangements, lighting, face landmarks, and other attributes of a masked digital image. In some cases, the masked image encoder is an encoder from a CoModGAN model as described by S. Zhao, J. Cui, Y. Sheng, Y. Dong, X. Liang, E. I. Chang, and Y. Xu in *Large Scale Image Completion via Co-Modulated Generative Adversarial Networks*, arXiv:2103.10428 (2021). Likewise, in these or other cases, other components of the face anonymization neural network are based on (or match) the architecture of corresponding components of CoModGAN.

As further illustrated in FIG. 5, the image anonymization system 102 combines the face anonymization guide 502 and the masked image vector 504 to produce the combined image mask-feature guide vector 506. Thus, the mask-feature guide vector 506 includes features pertaining to face attributes as well as features pertaining to a masked digital image with masked or removed face pixels for inpainting. The image anonymization system 102 thus utilizes the mask-feature guide vector 506 to guide a face anonymization neural network to generate an anonymized digital image.

Figure 6:
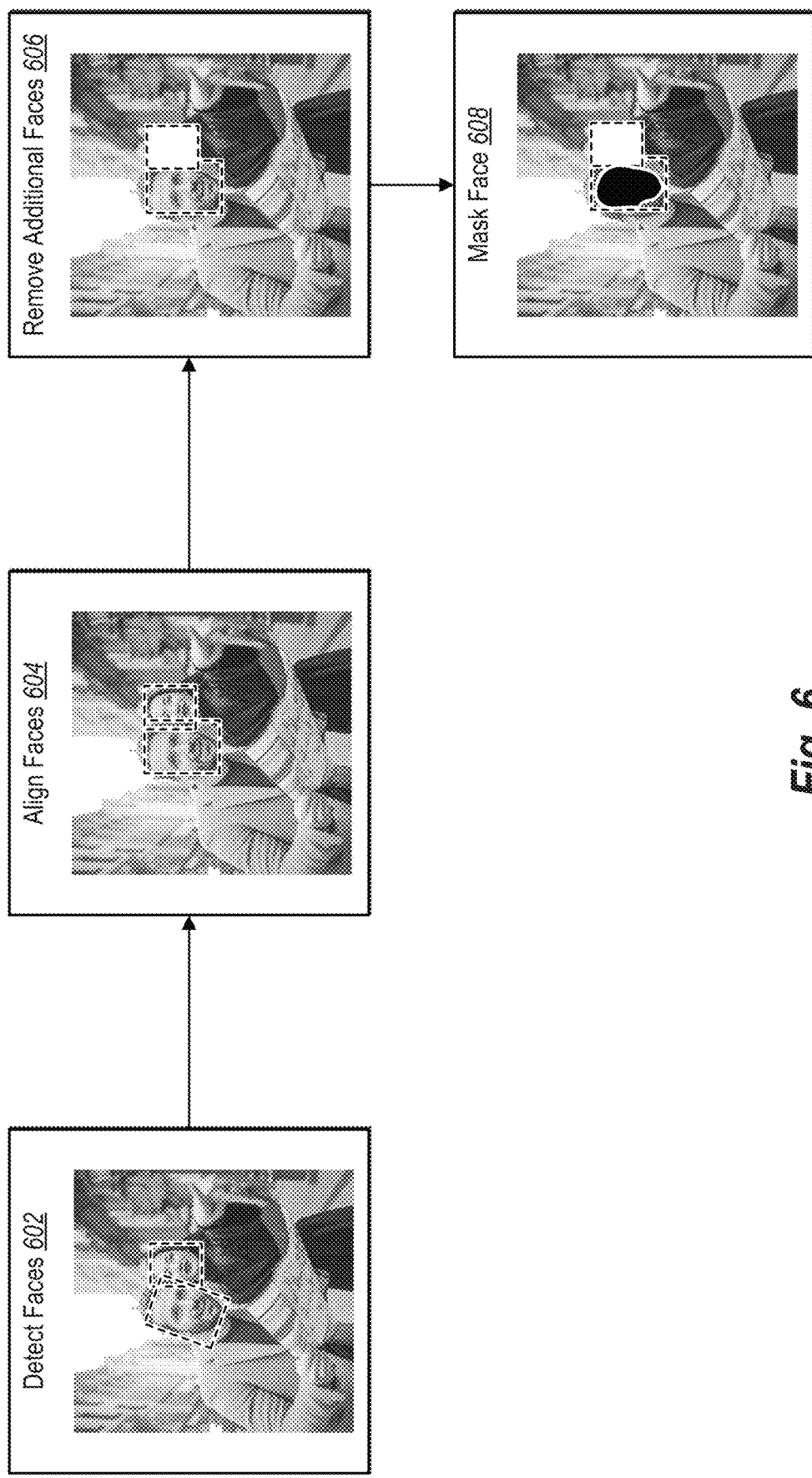
FIG. 6 illustrates an example diagram for masking face pixels in digital images depicting multiple faces in accordance with one or more embodiments.

As suggested above, in certain described embodiments, the image anonymization system 102 anonymizes digital images that depict multiple faces and/or faces that are tilted (e.g., not vertically aligned). In particular, the image anonymization system 102 anonymizes digital images depicting overlapping faces, something that prior systems struggle to do (or cannot do). FIG. 6 illustrates an example flow diagram for a smart mask algorithm for masking a face of a digital image depicting multiple overlapping faces in accordance with one or more embodiments.

In some cases, the image anonymization system 102 anonymizes one face in a digital image at a time. Thus, to generate accurate, realistic face pixels for each depicted face, the image anonymization system 102 removes additional faces for each iteration or application of the face anonymization neural network to thereby generate synthetic face pixels for one face at a time. In some circumstances, faces within a digital image are very close together or even overlapping. In some prior systems, this causes the system to treat the face pixels of multiple faces as a single face. To avoid this issue, the image anonymization system 102 utilizes a smart mask algorithm to distinguish between distinct faces.

To elaborate, as illustrated in FIG. 6, the image anonymization system 102 performs an act 602 to detect faces within a digital image. In particular, the image anonymization system 102 utilizes a face detection algorithm, such as the face detection neural network described in U.S. patent application Ser. No. 16/803,332 entitled AUTOMATICALLY MERGING PEOPLE AND OBJECTS FROM MULTIPLE DIGITAL IMAGES TO GENERATE A COMPOSITE DIGITAL IMAGE, filed Feb. 27, 2020, which is incorporated herein by reference in its entirety. As shown, the image anonymization system 102 detects multiple faces within the digital image and generates a boundary (e.g., a bounding box or some other bounding shape) around each of the faces.

In addition, the image anonymization system 102 performs an act 604 to align faces within the digital image. Indeed, in some cases, the image anonymization system 102 trains the face anonymization neural network on aligned faces, so when anonymizing a digital image, the image anonymization system 102 aligns faces so that the face anonymization neural network will be more effective and more accurately generate synthetic face pixels. As shown, the image anonymization system 102 aligns the face of the man by rotating or otherwise manipulating the boundary of the face (including the pixels therein) to vertically align the boundary (e.g., by removing tilt).

As further illustrated in FIG. 6, the image anonymization system 102 performs an act 606 to remove additional faces. For example, the image anonymization system 102 detects the depicted faces (e.g., within the aligned digital image) and removes pixels of additional faces. As shown, the image anonymization system 102 removes the face of the woman to prevent or reduce errors when anonymizing the face of the man. In particular, the image anonymization system 102 removes additional faces by removing or excluding face pixels for the additional faces from the digital image or from the boundary of the subject face (e.g., the face of the man). In cases where there are more than two faces in the digital image, the image anonymization system 102 removes all additional faces other than the subject face for each iteration. Thus, the image anonymization system 102 ensures that pixels of overlapping faces do not impact the face anonymization neural network.

The image anonymization system 102 further performs an act 608 to mask the subject face (e.g., the non-removed face). Indeed, as described above the image anonymization system 102 generates a masked digital image by masking face pixels of a face depicted in the digital image. For example, the image anonymization system 102 masks the face pixels by removing or excluding them from the boundary around the face. As another example, the image anonymization system 102 masks the face pixels by separating or segmenting a digital image (or a crop of a digital image) into foreground pixels and background pixels.

In some cases, the image anonymization system 102 generates a masked digital image in the form of a face crop by cropping a boundary around face depicted in a digital image and masking the face pixels within the boundary (after removing pixels of additional faces). Thus, the image anonymization system 102 passes the masked image crop to the face anonymization neural network to generate an anonymized digital image by inpainting masked face pixels with synthetic face pixels.

In some embodiments, the image anonymization system 102 performs a smart mask algorithm as described and illustrated in FIG. 6. In one or more implementations, the image anonymization system 102 performs a smart mask algorithm as given by the following pseudo code:

```
{
  require: Image "I": input digital image
  require: detect_faces: model or algorithm that generates
    boundaries around faces depicted
      in a digital image
  require: segment: model or function that takes a cropped image
    of a face and segments the
      image into foreground pixels and background pixels
  bboxes = detect_faces(I)
  mask = [ ]
  for each face index i do
    for each face index j != i do
      # remove the face from the image
      I[bboxes[j]] = (0, 0, 0)
    end
    masks[i] = segment(I[bboxes[i]])
  end
  return masks
}.
```

Figure 7:
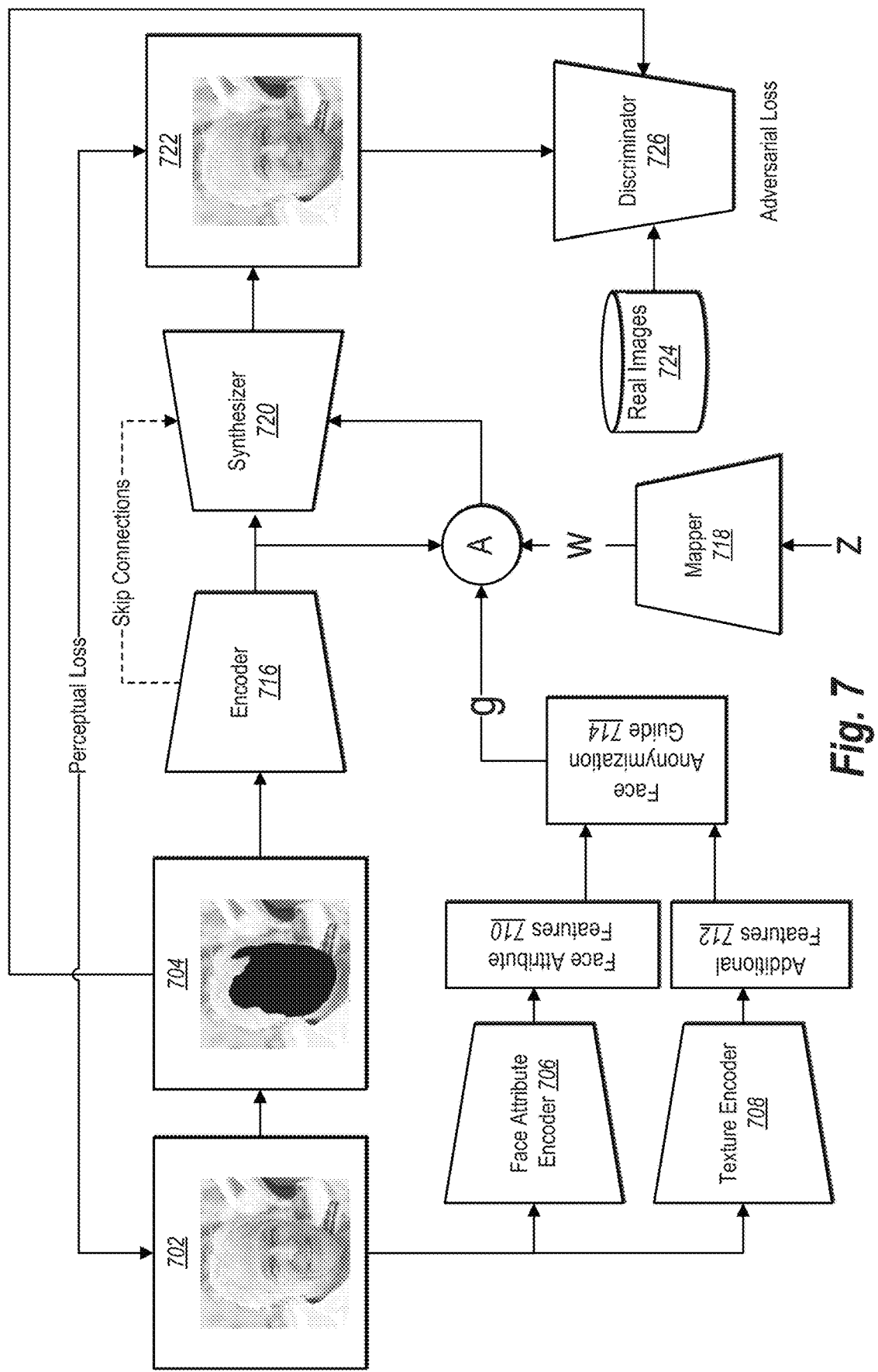
FIG. 7 illustrates an example diagram for training a face anonymization neural network in accordance with one or more embodiments.

As mentioned above, in certain embodiments, the image anonymization system 102 trains a face anonymization neural network to anonymize digital images according to a face anonymization guide. In particular, the image anonymization system 102 utilizes a generative adversarial training process to learn parameters for the face anonymization neural network, including its internal neural networks. FIG. 7 illustrates an example training diagram for the face anonymization neural network in accordance with one or more embodiments.

As illustrated in FIG. 7, the image anonymization system 102 identifies or accesses a sample digital image 702 for training a face anonymization neural network. As described above, the image anonymization system 102 passes the sample digital image 702 to a face attribute encoder 706 and a texture encoder 708 of a face anonymization neural network. In turn, the face attribute encoder 706 and the texture encoder 708 process the sample digital image 702 to generate or extract respective features. Indeed, as discussed, the face attribute encoder 706 extracts face attribute features 710. The texture encoder 708 extracts additional features 712 (e.g., texture features and other image features).

As shown, the image anonymization system 102 further generates a face anonymization guide 714 (represented as g) as part of the illustrated training iteration. To generate the face anonymization guide 714, as described, the image anonymization system 102 combines the face attribute features 710 and the additional features 712. In addition, the image anonymization system 102 combines the face anonymization guide 714 with a masked image vector and a mapped noise vector as part of the training process. To generate the masked image vector, the image anonymization system 102 first generates the masked digital image 704 from the sample digital image 702 and further utilizes the encoder 716 to extract the masked image vector from the masked digital image 704.

In addition, the image anonymization system 102 generates a mapped noise vector W by utilizing a mapper 718 as part of the face anonymization neural network (e.g., included as part of the network for training purposes). In some cases, the mapper 718 is an encoder that maps a random noise vector z into a latent space for co-modulating with the masked image vector and/or the face anonymization guide 714. Indeed, the image anonymization system 102 combines (e.g., adds or concatenates) the masked image vector, the face anonymization guide 714, and the mapped noise vector W to generate a style vector. The image anonymization system 102 further utilizes the style vector to guide the synthesizer 720 to generate the anonymized digital image 722 as a realistic digital image with another identity that has attributes similar to (or the same as) the sample digital image 702.

As further illustrated in FIG. 7, the image anonymization system 102 utilizes a discriminator 726 (e.g., included as part of the face anonymization neural network during training) to generate or determine an adversarial loss. Indeed, as part of the training process, the image anonymization system 102 determines one or more losses associated with the face anonymization neural network. For example, the image anonymization system 102 determines a perceptual loss in addition to an adversarial loss associated with one or more components of the face anonymization neural network. Over multiple training iterations generating anonymized digital images from sample digital images, the image anonymization system 102 modifies parameters of the various components of the face anonymization neural network to reduce one or more of the perceptual loss or the adversarial loss to achieve respective threshold measures of loss for each For example, the image anonymization system 102 determines an adversarial loss based on a realism prediction for the anonymized digital image 722. For example, the image anonymization system 102 utilizes the discriminator 726 to determine a realism prediction that indicates a measure of how realistic the anonymized digital image 722 is based on one or more stored digital images within a database of real images 724. In some cases, the image anonymization system 102 utilizes the discriminator 726 to determine the realism prediction based on the real images 724, the anonymized digital image 722, and the masked digital image 704. In some cases, the image anonymization system 102 generates a realism prediction in the form of realism score indicating a measure (e.g., a probability or a likelihood) that the anonymized digital image 722 generated by the face anonymization neural network is real. In other cases, the image anonymization system 102 generates a binary realism prediction that indicates whether the anonymized digital image 722 is real.

Based on the realism prediction (or based on the adversarial loss corresponding to the realism prediction), the image anonymization system 102 modifies parameters of the face anonymization neural network. For example, the image anonymization system 102 determines the adversarial loss as a measure of error or loss associated with the anonymized digital image 722 generated by the face anonymization neural network. To reduce the adversarial loss (and/or the perceptual loss) for subsequent training iterations, the image anonymization system 102 adjusts internal weights and biases of encoder neural networks, generator neural networks, and/or discriminator neural networks within the overall neural network architecture to improve accuracy in generating realistic anonymized digital images.

To determine a perceptual loss, in some embodiments, the image anonymization system 102 compares the anonymized digital image 722 with a real digital image (e.g., from the real images 724). For example, the image anonymization system 102 compares pixels of the anonymized digital image 722 with pixels of the real images 724 to determine (pixel-wise) distances between them in an embedding space.

In some embodiments, the image anonymization system 102 learns parameters for the face anonymization neural network using a sample dataset of tuples (where each tuple includes a sample digital image, a face region binary mask, and a face anonymization guide) in the form of $\mathcal{D} = \{(I_i, m_i, g_i)\}_{i=1}^{N}$, where I represents a sample digital image, m represents a face region binary mask for face pixels of the sample digital image I, and g represents an anonymization guide generated from the sample digital image I. To illustrate by example, for a given face image I of size 1024×1024 pixels (e.g., the sample digital image 702), the image anonymization system 102 extracts a face region binary mask m and a face anonymization guide g that represents image features (e.g., gender, ethnicity, age, expression, and/or other features). In some cases, the image anonymization system 102 generates the face anonymization guide g as an output of a regressor or a combination of outputs of multiple regressors or classifiers (e.g., the face attribute encoder 706 and the texture encoder 708).

In some embodiments, the image anonymization system 102 generates the masked digital image 704 by multiplying $m_i$ and $I_i$ to apply a binary mask to the sample digital image 702. For example, the image anonymization system 102 generates the masked digital image 704 given by the following equation:

$$I_i^M = m_i * I_i$$

where $I_i^M$ represents the masked digital image 704 and the other terms are as defined above.

In certain embodiments, the image anonymization system 102 further trains the face anonymization neural network by utilizing a CoModGAN generator, such as the synthesizer 720. For instance, the image anonymization system 102 learns parameters for the synthesizer 720 such that $\mathcal{G}(I^M, g)$ is a realistic digital image that is an anonymized version of the sample digital image 702, where $\mathcal{G}$ represents the synthesizer 720 and $\mathcal{G}(\ldots)$ represents an anonymized digital image generated by the synthesizer 720 (e.g., the anonymized digital image 722). To achieve this, the image anonymization system 102 co-modulates a masked image vector $\varepsilon(I_i^M)$, extracted by the encoder 716 and a mapped noise vector W (or otherwise expressed as $\mathcal{M}(z)$) extracted by the mapper from a random generated noise vector $z\mathcal{N}(0,1)$. In some cases, the image anonymization system 102 further adds the face anonymization guide 714 (g) to the co-modulated vectors. The image anonymization system 102 thus generates a style vector as given by the following:

$$s = A(\varepsilon(I_i^M), \mathcal{M}(z), g_i)$$

where s represents the style vector from which the synthesizer 720 generates the anonymized digital image 722, A represents a co-modulator (or some other combinator), and the other terms are as defined above. In some embodiments, the image anonymization system 102 trains the face anonymization neural network with a perceptual loss weight of 4.0 over 25 million images.

Figure 8A:
FIGS. 8A-8B illustrate example anonymized digital images generated by the image anonymization system in accordance with one or more embodiments.
Figure 8B:
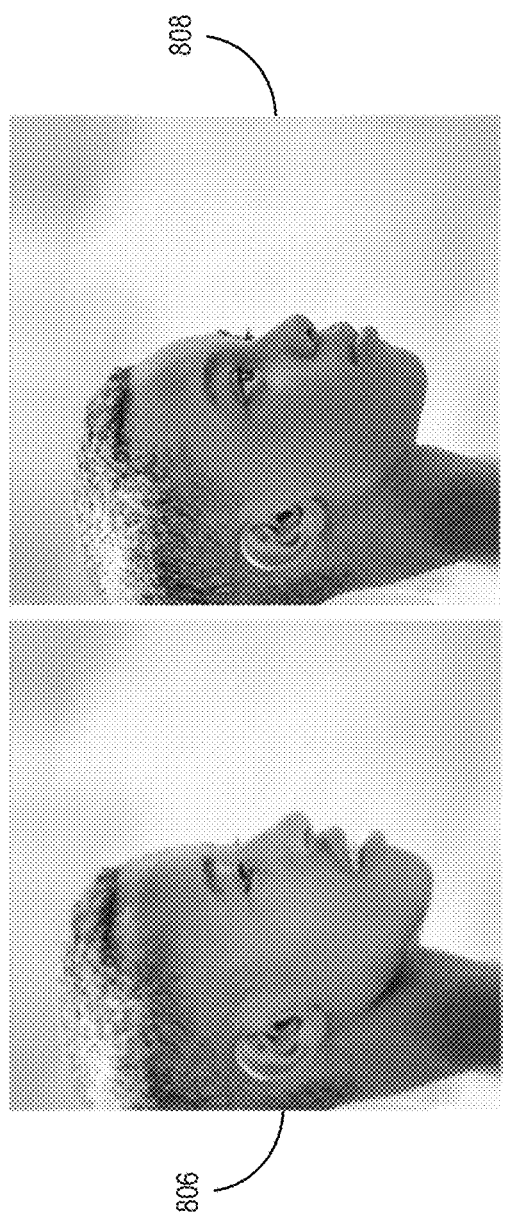

As mentioned, in certain embodiments, the image anonymization system 102 generates anonymized digital image from digital images depicting faces. Even in circumstances where depicted faces are in difficult poses (e.g., a profile view), the image anonymization system 102 accurately anonymizes the digital images. FIGS. 8A-8B illustrate example anonymized digital images generated from initial digital images via the image anonymization system 102 in accordance with one or more embodiments.

As illustrated in FIG. 8A, the image anonymization system 102 generates the anonymized digital image 804 from the digital image 802. More specifically, the image anonymization system 102 utilizes a face anonymization neural network as described above to process the digital image 802 and generate the anonymized digital image 804. In particular, the image anonymization system 102 detects the face depicted within the digital image 802 and extracts face attribute features (and other features) utilizing one or more encoders. In addition, the image anonymization system 102 generates a face anonymization guide. The image anonymization system 102 further generates a masked image vector to combine with the face anonymization guide by masking the face pixels of the digital image 802 and utilizing an encoder to the masked image vector from the masked version of the digital image 802. The image anonymization system 102 further applies a synthesizer to synthesize face pixels to fill the masked face pixels according to the face anonymization guide and the masked image vector. As shown, the image anonymization system 102 generates the anonymized digital image 804 that is realistic and that reflects specific attributes present in the digital image 802, including gender, ethnicity, age, and expression.

As illustrated in FIG. 8B, the image anonymization system 102 generates an anonymized digital image 808 from a digital image 806 depicting a face in a profile pose. For many systems, profile poses (and other non-frontal poses) are difficult to process because certain face landmarks and attributes are not visible, such as both eyes and ears. Indeed, many conventional models are trained on frontal views of faces and these models therefore often struggle to generate pixels for non-frontal views because the learned parameters of the models do not account for the different requirements for generating pixels of faces in different poses.

To generate accurate anonymized digital images for faces in non-frontal poses, the image anonymization system 102 modifies a training dataset for more robust training of the face anonymization neural network. To elaborate, the image anonymization system 102 accounts for profile poses (and other non-frontal poses) by extracting yaw values (e.g., utilizing an encoder neural network) from sample digital images in a training dataset and manipulating the yaw values to mimic non-frontal face poses. Indeed, most training datasets include few non-frontal faces for learning network parameters, but the image anonymization system 102 overcomes this deficiency by modifying the sample images themselves for more accurate training on non-frontal poses.

In some embodiments, the image anonymization system 102 extracts yaw values between 0 and 1, where 0 indicates a left-side profile and 1 indicates a right-side profile. The image anonymization system 102 further selects sample images that satisfy a first yaw threshold for left-side profiles (e.g., less than 0.35) or a second yaw threshold for right-side profiles (e.g., greater than 0.65). In some cases, the image anonymization system 102 selects 90,000 images that have these more extreme yaw values to train the face anonymization neural network.

During training, the image anonymization system 102 also aligns the sample digital images. For instance, the image anonymization system 102 identifies those images with yaw values below a first threshold (e.g., below 0.35) and flips the images such that all of the sample training images depict right-side profile faces. In one or more embodiments, the image anonymization system 102 defines training bins based on yaw and assigns each sample digital image to a bin. Specifically, the image anonymization system 102 defines bins to include sample digital images with yaw values within a certain window or range (e.g., from 0.65 to 0.70, from 0.70 to 0.75, and so on). For example, the image anonymization system 102 generates a training dataset of sample digital images according to the following table, where the seven bins correspond to the different yaw values:

| Yaw | Number of Sample Images |
|---|---|
| 0.65 | 57965 |
| 0.70 | 25983 |
| 0.75 | 6282 |
| 0.80 | 871 |
| 0.85 | 57 |
| 0.90 | 3 |
| 0.95 | 0 |

To compensate for the imbalance in numbers of sample images across the different yaw values, the image anonymization system 102 also utilizes an oversampling technique. Specifically, the image anonymization system 102 modifies the sampling of the bins to reduce the impact of the unbalanced data in terms of yaw. For example, the image anonymization system 102 identifies a bin with a largest number of sample images (e.g., 0.65 to 0.70) and designates its number of images as N. Thus, for any bin with M sample images, the image anonymization system 102 samples for $\sqrt{N-M}$ times randomly from that bin. Sampling in this way reduces the impact of imbalanced yaw data and improves results of the face anonymization neural network.

As shown in FIG. 8B, the image anonymization system 102 generates the anonymized digital image 808 from the digital image 806. As illustrated, the image anonymization system 102 generates the anonymized digital image 808 by replacing face pixels of the digital image 806 with synthetic face pixels that appear realistic and that preserve face attributes, such as gender, ethnicity, age, and expression.

Figure 9:
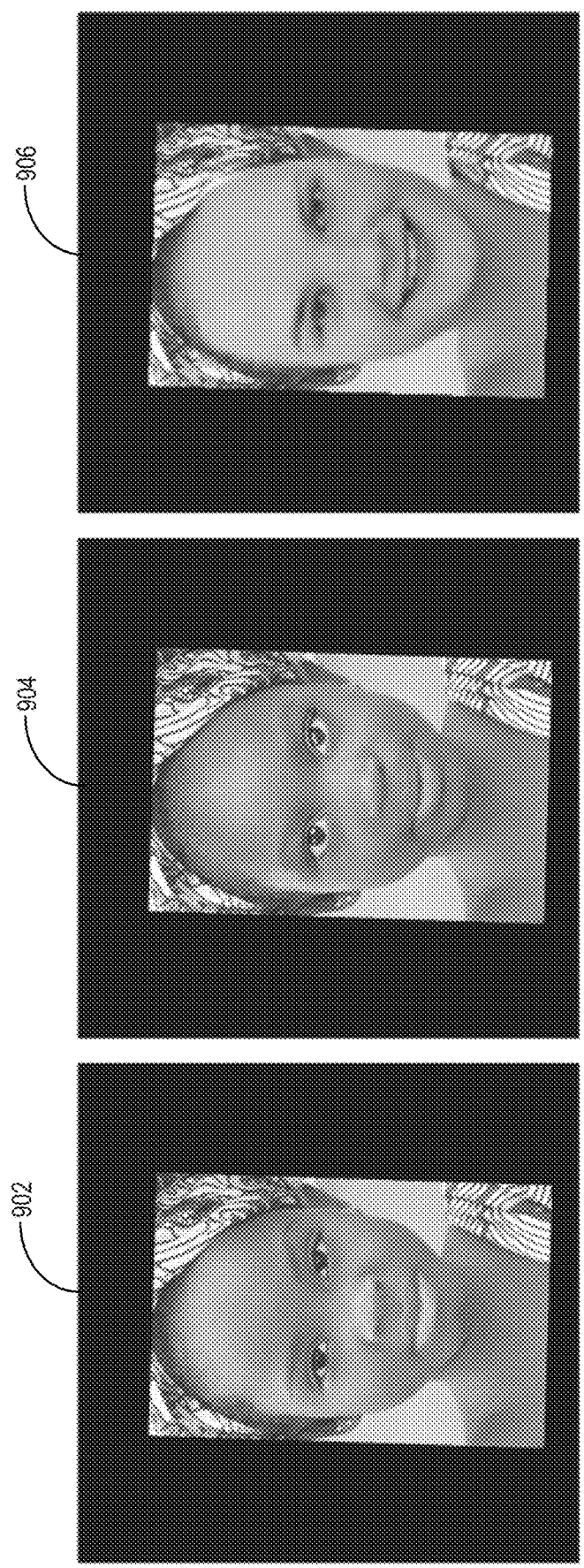
FIG. 9 illustrates an example comparison of anonymized digital images in accordance with one or more embodiments.

As mentioned above, in certain embodiments, the image anonymization system 102 generates more accurate anonymized digital images than prior systems. In particular, the image anonymization system 102 more accurately generates synthetic face pixels that retain attributes of a person in a digital image, including gender, ethnicity, age, and expression. FIG. 9 illustrates an example comparison of an anonymizing a digital image utilizing the image anonymization system 102 versus another system.

As illustrated in FIG. 9, the image anonymization system 102 generates an anonymized digital image 904 from an originally captured digital image 902. In addition, a prior system called Deep Privacy, as described by H. Hukkelas, R. Mester, and F. Lindseth in *DeepPrivacy: A Generative Adversarial Network for Face Anonymization*, Int'l Symposium on Visual Computing (2019), generates the anonymized digital image 906. Comparing the anonymized digital image 906 with the anonymized digital image 904, the anonymized digital image 904 is a more accurate, realistic representation of an anonymized face than the anonymized digital image 906. Indeed, the image anonymization system 102 preserves skin tones (e.g., ethnicity) and facial expressions much more accurately than the Deep Privacy model, and the anonymized digital image 904 is therefore much more believable than the anonymized digital image 906.

Figure 10:
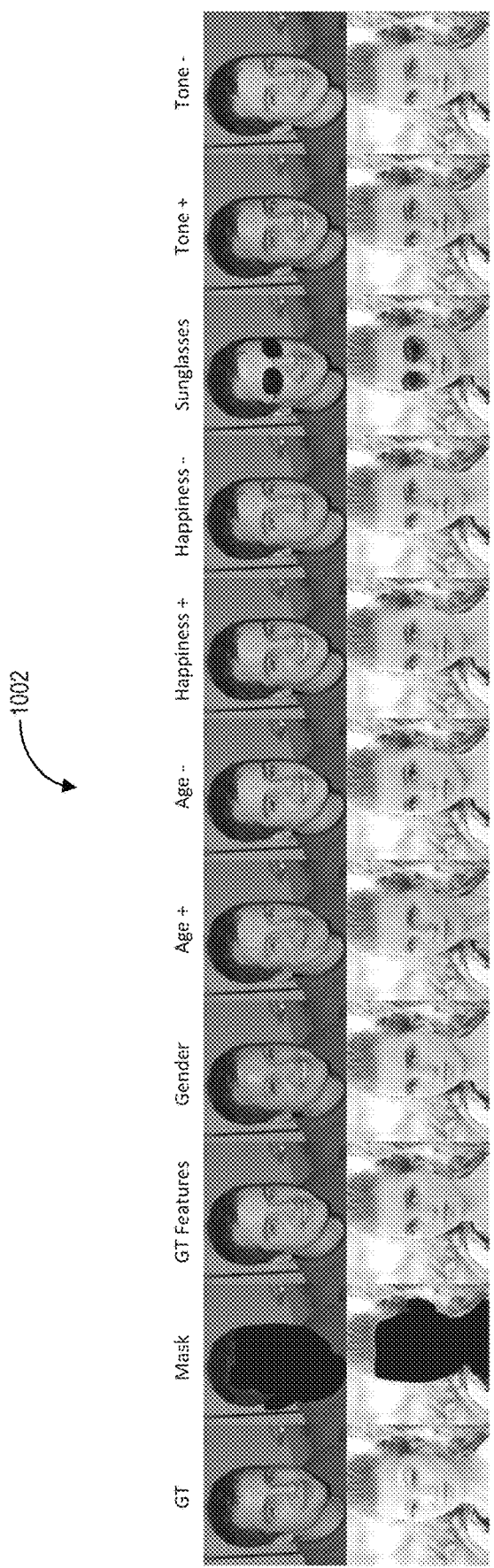
FIG. 10 illustrates example anonymized digital images varying face attribute features in accordance with one or more embodiments.

As mentioned above, in certain embodiments, the image anonymization system 102 guides face pixel inpainting based on various face attributes. In particular, the image anonymization system 102 extracts features corresponding to specific face attributes. In some cases, the image anonymization system 102 further modifies individual features to adjust face attributes in an anonymized digital image. FIG. 10 illustrates an example table of images illustrating anonymized digital images resulting from adjustments to individual face attribute features.

As illustrated in FIG. 10, the table 1002 depicts two rows of anonymized digital images generated by the image anonymization system 102 utilizing a face anonymization neural network. More specifically, the table 1002 depicts ground truth digital images that are unmodified on the far left ("GT"). In addition, the table 1002 depicts masked digital images indicating face pixels to inpaint from the ground truth digital images ("Mask"). The image anonymization system 102 further depicts anonymized digital images resulting from applying the face anonymization neural network and/or modifying various face attribute features.

For instance, the "GT Features" column includes anonymized digital images utilizing unmodified face attribute features extracted from the respective ground truth digital images. For each of the remaining columns, the image anonymization system 102 generates anonymized digital images based on the extracted face attribute features while also modifying one of the face attribute features. For example, the image anonymization system 102 modifies a gender, an age, an expression, and/or a skin tone as part of the anonymization process to adjust the appearance of the anonymized digital images. As shown, the image anonymization system 102 generates "Gender" images by changing gender-related features of the ground truth images. By modifying individual face attributes features (e.g., by changing its value between −1 and 1), the image anonymization system 102 further generates older images ("Age+"), younger images ("Age−"), happier images ("Happiness+"), less happy images ("Happiness−"), images with added sunglasses ("Sunglasses"), and/or images with lighter or darker skin tones ("Tone−" and Tone+").

In some cases, the image anonymization system 102 receives user interaction within a graphical user interface to adjust one or more face attributes. For example, the image anonymization system 102 provides a selectable slider for each face attribute whereby a user can adjust face attribute feature values. Based on the user interactions to adjust the face attribute feature values, the image anonymization system 102 generates anonymized digital images accordingly.

Figure 11:
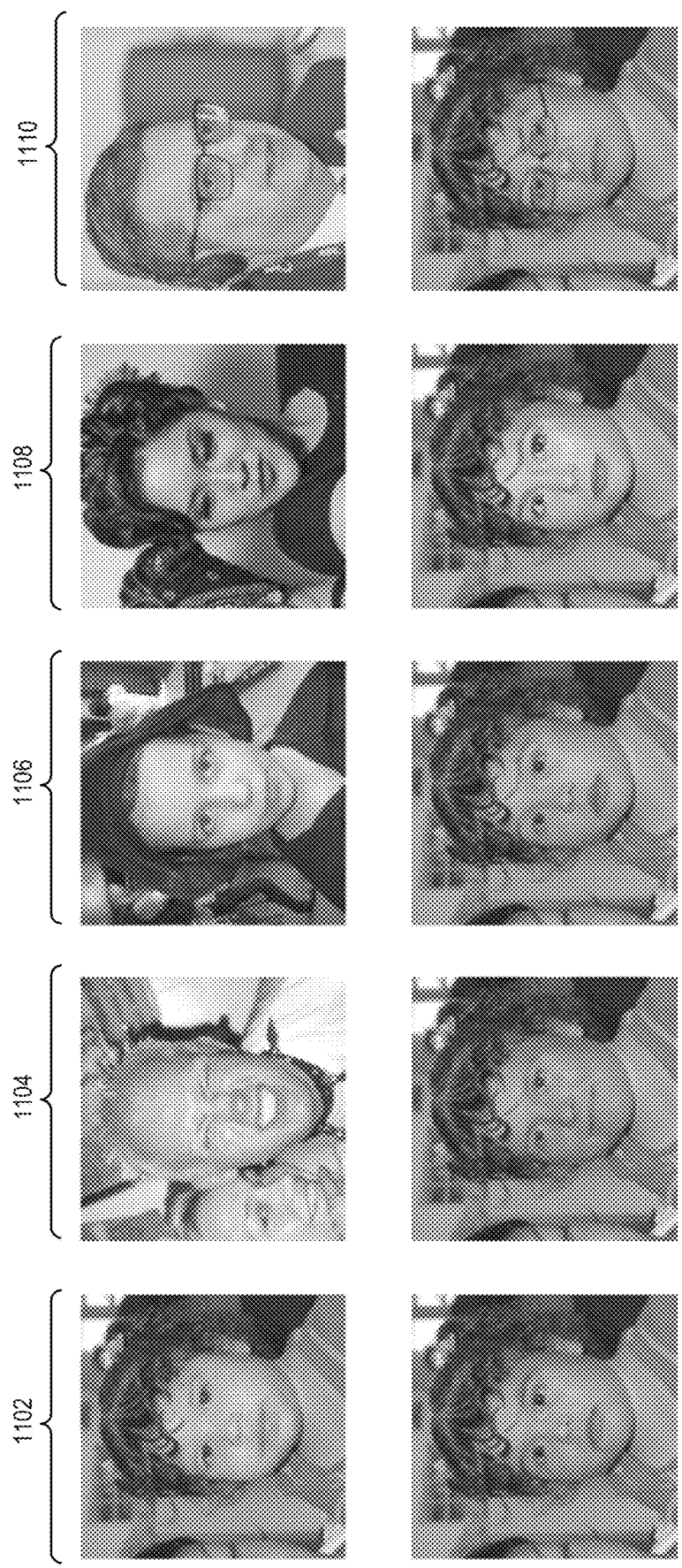
FIG. 11 illustrates example anonymized digital images using a face swapping technique in accordance with one or more embodiments.

As suggested, in certain embodiments, the image anonymization system 102 is capable of performing face swapping functions. In particular, the image anonymization system 102 swaps face pixels from one digital image for use in combining with another digital image. In some cases, the image anonymization system 102 further anonymizes a digital image while swapping face pixels. FIG. 11 illustrates example face swap images in accordance with one or more embodiments.

As illustrated in FIG. 11, the column 1102 illustrates an original digital image (top) and an anonymized digital image (bottom) generated from the original digital image via a face anonymization neural network. In addition, the column 1104 includes a swap image (top) and an anonymized image (bottom) that the image anonymization system 102 generates by anonymizing the original digital image while swapping face pixels with those of the swap image. As shown, the anonymized image exhibits attributes of the swap image while retaining face attribute features of the original image. Likewise, the remaining columns 1106, 1108, and 1110 each include a swap image (top) and an anonymized digital image (bottom) that depicts swapped face pixels from its respective swap image.

Figure 12:
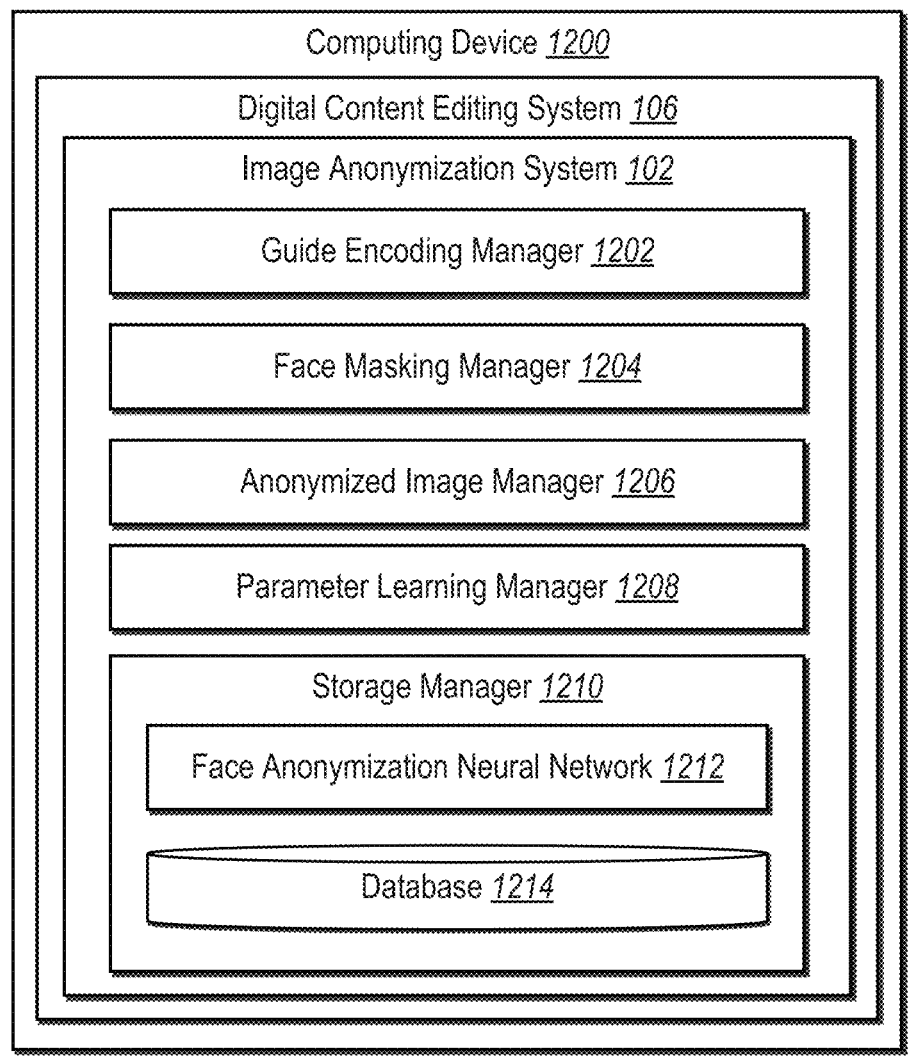
FIG. 12 illustrates an example schematic diagram of an image anonymization system in accordance with one or more embodiments.

Looking now to FIG. 12, additional detail will be provided regarding components and capabilities of the image anonymization system 102. Specifically, FIG. 12 illustrates an example schematic diagram of the image anonymization system 102 on an example computing device 1200 (e.g., one or more of the client device 108 and/or the server(s) 104). As shown in FIG. 12, the image anonymization system 102 includes a guide encoder manager 1202, a face masking manager 1204, an anonymized image manager 1206, a parameter learning manager 1208, and a storage manager 1210.

As just mentioned, the image anonymization system 102 includes a guide encoding manager 1202. In particular, the guide encoding manager 1202 manages, maintains, generates, encodes, or extracts a face anonymization guide from a digital image. For example, the guide encoding manager 1202 extracts a face anonymization guide by utilizing one or more encoders of a face anonymization neural network. In some cases, the guide encoding manager 1202 encodes a first feature set using a first encoder and a second feature set using a second encoder, and the guide encoding manager 1202 further combines the first and second feature sets to form the face anonymization guide.

In addition, the image anonymization system 102 includes a face masking manager 1204. In particular, the face masking manager 1204 manages, maintains, generates, determines, or applies a binary mask to face pixels of a digital image. For example, the face masking manager 1204 masks face pixels to be replaced with synthetic face pixels for anonymizing a digital image. In some cases, the face masking manager 1204 masks or removes pixels of additional faces to avoid blending face pixels for images depicting multiple faces that are close together and/or overlapping.

As further illustrated in FIG. 12, the image anonymization system 102 includes an anonymized image manager 1206. In particular, the anonymized image manager 1206 manages, generates, determines, encodes, or synthesizes an anonymized digital image. For example, anonymized image manager 1206 utilizes a face anonymization neural network (including a generator or synthesizer) to generate synthetic face pixels as guided by a face anonymization guide to fill masked face pixels of a masked digital image. The anonymized image manager 1206 synthesizes face pixels to preserve face attributes, such as gender, ethnicity, age, and expression.

Additionally, the image anonymization system 102 includes a parameter learning manager 1208. In particular, the parameter learning manager 1208 manages, maintains, learns, or determines parameters for a face anonymization neural network. For example, the parameter learning manager 1208 trains a face anonymization neural network using a training process to learn parameters of one or more encoders, decoders, and/or other components of the face anonymization neural network.

The image anonymization system 102 further includes a storage manager 1210. The storage manager 1210 operates in conjunction with the other components of the image anonymization system 102 and includes one or more memory devices such as the database 1214 (e.g., the database 112) that stores various data such as digital images, neural networks, and anonymized digital images. As shown, the storage manager 1210 also manages or maintains the face anonymization neural network 1212 for anonymizing digital images using one or more additional components of the image anonymization system 102 as described above.

In one or more embodiments, each of the components of the image anonymization system 102 are in communication with one another using any suitable communication technologies. Additionally, the components of the image anonymization system 102 are in communication with one or more other devices including one or more client devices described above. It will be recognized that although the components of the image anonymization system 102 are shown to be separate in FIG. 12, any of the subcomponents may be combined into fewer components, such as into a single component, or divided into more components as may serve a particular implementation. Furthermore, although the components of FIG. 12 are described in connection with the image anonymization system 102, at least some of the components for performing operations in conjunction with the image anonymization system 102 described herein may be implemented on other devices within the environment.

The components of the image anonymization system 102 include software, hardware, or both. For example, the components of the image anonymization system 102 include one or more instructions stored on a computer-readable storage medium and executable by processors of one or more computing devices (e.g., the computing device 1200). When executed by the one or more processors, the computer-executable instructions of the image anonymization system 102 cause the computing device 1200 to perform the methods described herein. Alternatively, the components of the image anonymization system 102 comprise hardware, such as a special purpose processing device to perform a certain function or group of functions. Additionally, or alternatively, the components of the image anonymization system 102 include a combination of computer-executable instructions and hardware.

Furthermore, the components of the image anonymization system 102 performing the functions described herein may, for example, be implemented as part of a stand-alone application, as a module of an application, as a plug-in for applications including content management applications, as a library function or functions that may be called by other applications, and/or as a cloud-computing model. Thus, the components of the image anonymization system 102 may be implemented as part of a stand-alone application on a personal computing device or a mobile device. Alternatively, or additionally, the components of the image anonymization system 102 may be implemented in any application that allows creation and delivery of content to users, including, but not limited to, applications in ADOBE® EXPERIENCE MANAGER and CREATIVE CLOUD®, such as PHOTOSHOP®, LIGHTROOM®, and INDESIGN®. "ADOBE," "ADOBE EXPERIENCE MANAGER," "CREATIVE CLOUD," "PHOTOSHOP," "LIGHTROOM," and "INDESIGN" are either registered trademarks or trademarks of Adobe Inc. in the United States and/or other countries.

FIGS. 1-12 the corresponding text, and the examples provide a number of different systems, methods, and non-transitory computer readable media for generating an anonymized digital image utilizing a face anonymization neural network. In addition to the foregoing, embodiments can also be described in terms of flowcharts comprising acts for accomplishing a particular result. For example, FIG. 13 illustrates a flowchart of an example sequence or series of acts in accordance with one or more embodiments.

Figure 13:
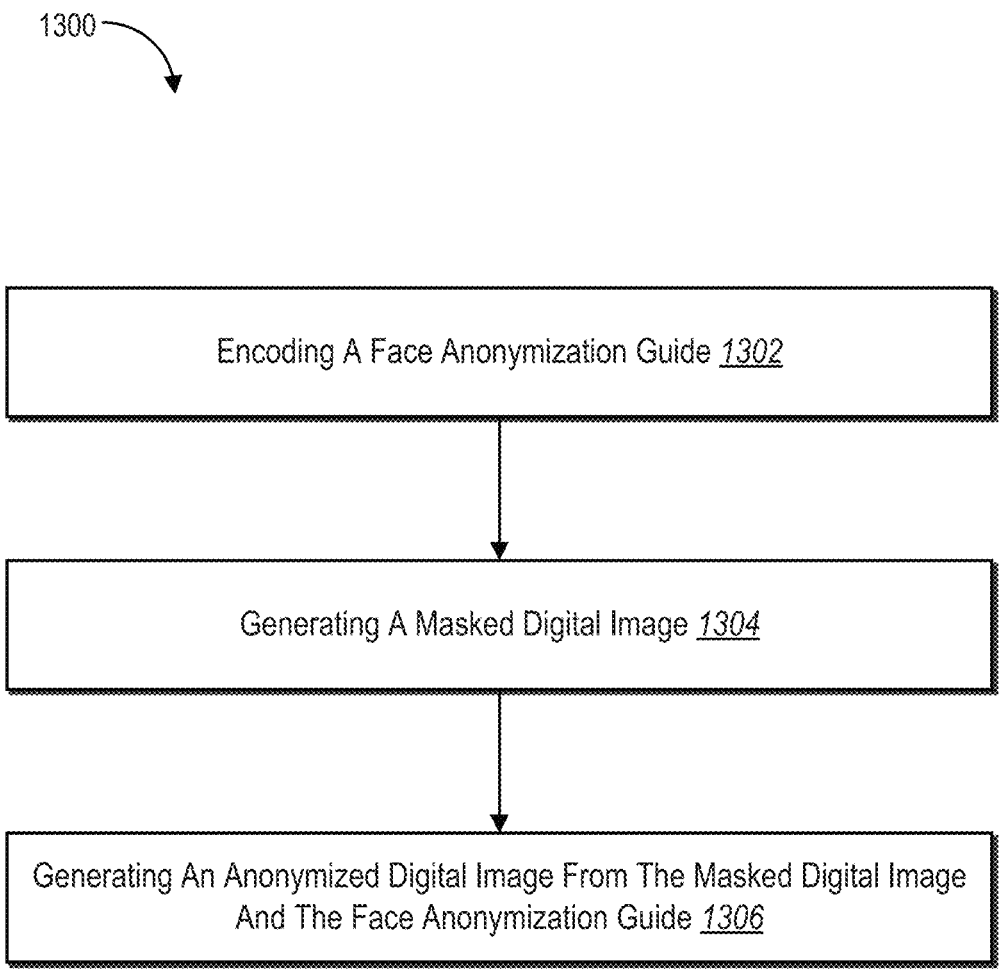
FIG. 13 illustrates an example flowchart of a series of acts for generating an anonymized digital image utilizing a face anonymization neural network in accordance with one or more embodiments.

While FIG. 13 illustrates acts according to a particular embodiment, alternative embodiments may omit, add to, reorder, and/or modify any of the acts shown in FIG. 13. The acts of FIG. 13 can be performed as part of a method. Alternatively, a non-transitory computer readable medium can comprise instructions, that when executed by one or more processors, cause a computing device to perform the acts of FIG. 13. In still further embodiments, a system can perform the acts of FIG. 13. Additionally, the acts described herein may be repeated or performed in parallel with one another or in parallel with different instances of the same or other similar acts.

FIG. 13 illustrates an example series of acts 1300 for generating an anonymized digital image utilizing a face anonymization neural network. In particular, the series of acts 1300 includes an act 1302 of encoding a face anonymization guide. For example, the act 1302 involves encoding, from a digital image depicting a face of a person, a face anonymization guide comprising features representing one or more of gender, ethnicity, age, or expression associated with the face in the digital image. In some embodiments, the act 1302 involves utilizing a first encoder of the generative adversarial neural network to extract a first feature set and a second encoder of the generative adversarial neural network to extract a second feature set from the digital image. In these or other embodiments, the act 1302 involves combining the first feature set and the second feature set into a guide feature set. For example, the act 1302 involves utilizing a first encoder neural network of the generative adversarial neural network to encode features representing gender, ethnicity, age, and expression for the face in the digital image, utilizing a second encoder of the generative adversarial neural network to encode additional features for the face depicted in the digital image, and combining the features from the first encoder and the additional features from the second encoder into the face anonymization guide.

In addition, the series of acts 1300 includes an act 1304 of generating a masked digital image. In particular, the act 1304 involves generating a masked digital image from the digital image by masking face pixels for the face depicted in the digital image. In some cases, the act 1304 involves detecting additional faces depicted in the digital image in addition to the face of the person. In these or other cases, the act 1304 involves removing pixels of the additional faces so that a boundary for the face depicted in the digital image does not include the pixels of the additional faces and masking the face pixels for the face depicted within the boundary. In one or more embodiments, the act 1304 involves generating a boundary around the face depicted in the digital image, aligning the boundary to orient the face pixels by removing tilt, and masking the face pixels aligned within the boundary.

In one or more embodiments, the act 1304 involves detecting an additional face depicted in the digital image in addition to the face of the person. In the same or other embodiments, the act 1304 involves removing pixels of the additional face to remove the additional face from a boundary around the face depicted in the digital image and masking the face pixels for the face depicted within the boundary. In certain implementations, the act 1304 involves detecting an additional face depicted in the digital image in addition to the face of the person, removing pixel values for pixels of the additional face in the digital image, generating a boundary for the face depicted in the digital image including pixels with removed pixel values for the additional face, and masking the face pixels for the face depicted within the boundary.

As further illustrated, the series of acts 1300 includes an act 1306 of generating an anonymized digital image from the masked digital image and the face anonymization guide. In particular, the act 1306 involves generating, from the masked digital image utilizing a generative adversarial neural network, an anonymized digital image by replacing the face pixels masked in the digital image with synthetic face pixels synthesized according to the face anonymization guide. For example, the act 1306 involves extracting a masked image vector from the masked digital image (utilizing a face anonymization neural network) and combining the masked image vector and the face anonymization guide utilizing the generative adversarial neural network. In some cases, the act 1306 involves synthesizing the synthetic face pixels utilizing a decoder of the generative adversarial neural network according to the face anonymization guide.

In certain embodiments, the act 1306 involves generating, from the masked image vector and the face anonymization guide utilizing a decoder of the generative adversarial neural network, an anonymized digital image by replacing the face pixels masked in the digital image with synthetic face pixels synthesized according to the face anonymization guide. In some cases, the act 1306 involves combining the masked image vector and the face anonymization guide to generate a combined image mask-feature guide vector and generating the anonymized digital image utilizing the decoder of the generative adversarial neural network from the combined image mask-feature guide vector. In some embodiments, the act 1306 involves extracting a masked image vector from the masked digital image utilizing an encoder of the generative adversarial neural network, generating a mapped noise vector by extracting features from a noise vector utilizing a mapper associated with the generative adversarial neural network, and synthesizing the synthetic face pixels from the face anonymization guide, the masked image vector, and the mapped noise vector utilizing a decoder of the generative adversarial neural network.

In some embodiments, the series of acts 1300 includes an act of determining a perceptual loss associated with the anonymized digital image and an adversarial loss associated with the generative adversarial neural network. In the same or other embodiments, the series of acts 1300 includes an act of modifying parameters of the generative adversarial neural network based on the perceptual loss and the adversarial loss. In certain implementations, the series of acts 1300 includes an act of determining an adversarial loss associated with the generative adversarial neural network and an act of modifying parameters of the generative adversarial neural network based on the adversarial loss. In some cases, the series of acts 1300 also includes acts of generating a modified stored digital image by adjusting a yaw of a face depicted within a stored digital image, generating a realism prediction for the anonymized digital image relative to the modified stored digital image utilizing a discriminator associated with the generative adversarial neural network, and determining the adversarial loss associated with the generative adversarial neural network based on the realism prediction. The series of acts 1300 sometimes includes acts of determining, based on the synthetic face pixels, a perceptual loss and an adversarial loss associated with the generative adversarial neural network and modifying parameters of the generative adversarial neural network to reduce the perceptual loss and the adversarial loss.

Embodiments of the present disclosure may comprise or utilize a special purpose or general-purpose computer including computer hardware, such as, for example, one or more processors and system memory, as discussed in greater detail below. Embodiments within the scope of the present disclosure also include physical and other computer-readable media for carrying or storing computer-executable instructions and/or data structures. In particular, one or more of the processes described herein may be implemented at least in part as instructions embodied in a non-transitory computer-readable medium and executable by one or more computing devices (e.g., any of the media content access devices described herein). In general, a processor (e.g., a microprocessor) receives instructions, from a non-transitory computer-readable medium, (e.g., a memory, etc.), and executes those instructions, thereby performing one or more processes, including one or more of the processes described herein.

Computer-readable media can be any available media that can be accessed by a general purpose or special purpose computer system. Computer-readable media that store computer-executable instructions are non-transitory computer-readable storage media (devices). Computer-readable media that carry computer-executable instructions are transmission media. Thus, by way of example, and not limitation, embodiments of the disclosure can comprise at least two distinctly different kinds of computer-readable media: non-transitory computer-readable storage media (devices) and transmission media.

Non-transitory computer-readable storage media (devices) includes RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other medium which can be used to store desired program code means in the form of computer-executable instructions or data structures and which can be accessed by a general purpose or special purpose computer.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links which can be used to carry desired program code means in the form of computer-executable instructions or data structures and which can be accessed by a general purpose or special purpose computer. Combinations of the above should also be included within the scope of computer-readable media.

Further, upon reaching various computer system components, program code means in the form of computer-executable instructions or data structures can be transferred automatically from transmission media to non-transitory computer-readable storage media (devices) (or vice versa). For example, computer-executable instructions or data structures received over a network or data link can be buffered in RAM within a network interface module (e.g., a "NIC"), and then eventually transferred to computer system RAM and/or to less volatile computer storage media (devices) at a computer system. Thus, it should be understood that non-transitory computer-readable storage media (devices) can be included in computer system components that also (or even primarily) utilize transmission media.

Computer-executable instructions comprise, for example, instructions and data which, when executed at a processor, cause a general-purpose computer, special purpose computer, or special purpose processing device to perform a certain function or group of functions. In some embodiments, computer-executable instructions are executed on a general-purpose computer to turn the general-purpose computer into a special purpose computer implementing elements of the disclosure. The computer executable instructions may be, for example, binaries, intermediate format instructions such as assembly language, or even source code.

Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the disclosure may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, tablets, pagers, routers, switches, and the like. The disclosure may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Embodiments of the present disclosure can also be implemented in cloud computing environments. In this description, "cloud computing" is defined as a model for enabling on-demand network access to a shared pool of configurable computing resources. For example, cloud computing can be employed in the marketplace to offer ubiquitous and convenient on-demand access to the shared pool of configurable computing resources. The shared pool of configurable computing resources can be rapidly provisioned via virtualization and released with low management effort or service provider interaction, and then scaled accordingly.

A cloud-computing model can be composed of various characteristics such as, for example, on-demand self-service, broad network access, resource pooling, rapid elasticity, measured service, and so forth. A cloud-computing model can also expose various service models, such as, for example, Software as a Service ("SaaS"), Platform as a Service ("PaaS"), and Infrastructure as a Service ("IaaS"). A cloud-computing model can also be deployed using different deployment models such as private cloud, community cloud, public cloud, hybrid cloud, and so forth. In this description and in the claims, a "cloud-computing environment" is an environment in which cloud computing is employed.

Figure 14:
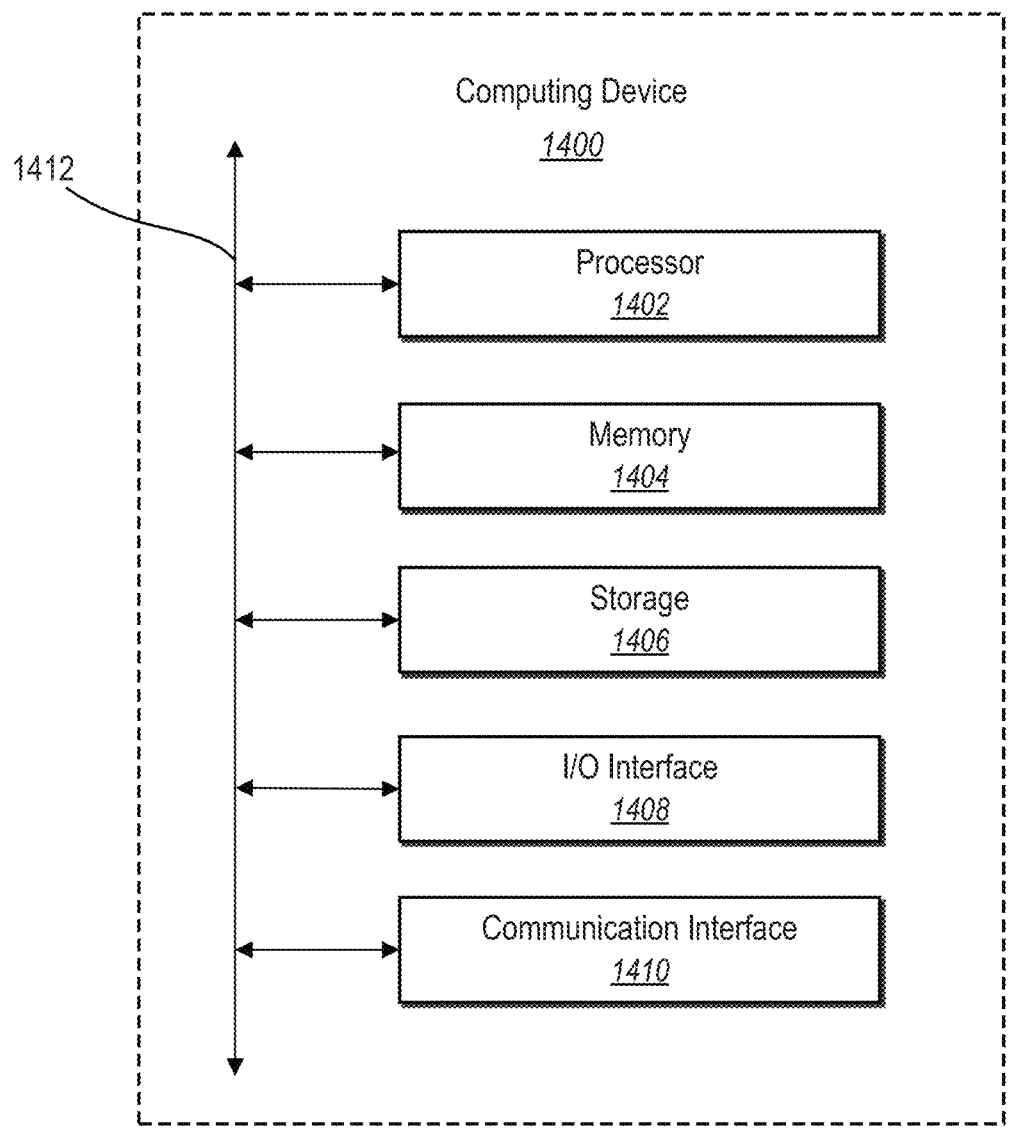
FIG. 14 illustrates a block diagram of an example computing device in accordance with one or more embodiments.

FIG. 14 illustrates, in block diagram form, an example computing device 1400 (e.g., the computing device 1200, the client device 108, and/or the server(s) 104) that may be configured to perform one or more of the processes described above. One will appreciate that the image anonymization system 102 can comprise implementations of the computing device 1400. As shown by FIG. 14, the computing device can comprise a processor 1402, memory 1404, a storage device 1406, an I/O interface 1408, and a communication interface 1410. Furthermore, the computing device 1400 can include an input device such as a touchscreen, mouse, keyboard, etc. In certain embodiments, the computing device 1400 can include fewer or more components than those shown in FIG. 14. Components of computing device 1400 shown in FIG. 14 will now be described in additional detail.

In particular embodiments, processor(s) 1402 includes hardware for executing instructions, such as those making up a computer program. As an example, and not by way of limitation, to execute instructions, processor(s) 1402 may retrieve (or fetch) the instructions from an internal register, an internal cache, memory 1404, or a storage device 1406 and decode and execute them.

The computing device 1400 includes memory 1404, which is coupled to the processor(s) 1402. The memory 1404 may be used for storing data, metadata, and programs for execution by the processor(s). The memory 1404 may include one or more of volatile and non-volatile memories, such as Random-Access Memory ("RAM"), Read Only Memory ("ROM"), a solid-state disk ("SSD"), Flash, Phase Change Memory ("PCM"), or other types of data storage. The memory 1404 may be internal or distributed memory.

The computing device 1400 includes a storage device 1406 includes storage for storing data or instructions. As an example, and not by way of limitation, storage device 1406 can comprise a non-transitory storage medium described above. The storage device 1406 may include a hard disk drive (HDD), flash memory, a Universal Serial Bus (USB) drive or a combination of these or other storage devices.

The computing device 1400 also includes one or more input or output ("I/O") devices/interfaces 1408, which are provided to allow a user to provide input to (such as user strokes), receive output from, and otherwise transfer data to and from the computing device 1400. These I/O devices/interfaces 1408 may include a mouse, keypad or a keyboard, a touch screen, camera, optical scanner, network interface, modem, other known I/O devices or a combination of such I/O devices/interfaces 1408. The touch screen may be activated with a writing device or a finger.

The I/O devices/interfaces 1408 may include one or more devices for presenting output to a user, including, but not limited to, a graphics engine, a display (e.g., a display screen), one or more output drivers (e.g., display drivers), one or more audio speakers, and one or more audio drivers. In certain embodiments, devices/interfaces 1408 is configured to provide graphical data to a display for presentation to a user. The graphical data may be representative of one or more graphical user interfaces and/or any other graphical content as may serve a particular implementation.

The computing device 1400 can further include a communication interface 1410. The communication interface 1410 can include hardware, software, or both. The communication interface 1410 can provide one or more interfaces for communication (such as, for example, packet-based communication) between the computing device and one or more other computing devices 1400 or one or more networks. As an example, and not by way of limitation, communication interface 1410 may include a network interface controller (NIC) or network adapter for communicating with an Ethernet or other wire-based network or a wireless NIC (WNIC) or wireless adapter for communicating with a wireless network, such as a WI-FI. The computing device 1400 can further include a bus 1412. The bus 1412 can comprise hardware, software, or both that couples components of computing device 1400 to each other.

In the foregoing specification, the invention has been described with reference to specific example embodiments thereof. Various embodiments and aspects of the invention(s) are described with reference to details discussed herein, and the accompanying drawings illustrate the various embodiments. The description above and drawings are illustrative of the invention and are not to be construed as limiting the invention. Numerous specific details are described to provide a thorough understanding of various embodiments of the present invention.

The present invention may be embodied in other specific forms without departing from its spirit or essential characteristics. The described embodiments are to be considered in all respects only as illustrative and not restrictive. For example, the methods described herein may be performed with less or more steps/acts or the steps/acts may be performed in differing orders. Additionally, the steps/acts described herein may be repeated or performed in parallel with one another or in parallel with different instances of the same or similar steps/acts. The scope of the invention is, therefore, indicated by the appended claims rather than by the foregoing description. All changes that come within the meaning and range of equivalency of the claims are to be embraced within their scope.

What is claimed is:

1. A non-transitory computer readable medium storing executable instructions which, when executed by a processing device, cause the processing device to perform operations comprising:
   encoding, from a digital image depicting a face of a person, a face anonymization guide utilizing a face anonymization neural network comprising a face attribute encoder and a texture encoder to:
      extract, utilizing the face attribute encoder, a first set of features representing one or more of gender, ethnicity, or age associated with the face in the digital image;
      extract, utilizing the texture encoder, a second set of features representing image texture of the digital image; and
      combine the first set of features and the second set of features into the face anonymization guide;
   generating a masked digital image from the digital image by masking face pixels for the face depicted in the digital image; and
   generating, from the masked digital image and utilizing a decoder of the face anonymization neural network, an anonymized digital image by replacing the face pixels masked in the digital image with synthetic face pixels synthesized according to the face anonymization guide, wherein generating the anonymized digital image comprises:
      extracting a masked image vector from the masked digital image; and
      combining the masked image vector and the face anonymization guide utilizing the face anonymization neural network.

2. The non-transitory computer readable medium of claim 1, wherein encoding the face anonymization guide further comprises utilizing a set of one or more concatenation layers of the face anonymization neural network to combine the first set of features and the second set of features into the face anonymization guide.

3. The non-transitory computer readable medium of claim 1, wherein generating the masked digital image comprises:
   detecting additional faces depicted in the digital image in addition to the face of the person;
   removing pixels of the additional faces so that a boundary for the face depicted in the digital image does not include the pixels of the additional faces; and
   masking the face pixels for the face depicted within the boundary.

4. The non-transitory computer readable medium of claim 1, wherein generating the masked digital image comprises:
   generating a boundary around the face depicted in the digital image;
   aligning the boundary to orient the face pixels by removing tilt; and
   masking the face pixels aligned within the boundary.

5. The non-transitory computer readable medium of claim 1, wherein combining the masked image vector and the face anonymization guide comprises utilizing one or more layers of the face anonymization neural network to concatenate the masked image vector and the face anonymization guide.

6. The non-transitory computer readable medium of claim 1, wherein generating the anonymized digital image comprises synthesizing the synthetic face pixels utilizing the decoder of the face anonymization neural network according to the face anonymization guide.

7. The non-transitory computer readable medium of claim 1, further storing executable instructions which, when executed by the processing device, cause the processing device to perform operations comprising:
    determining a perceptual loss associated with the anonymized digital image and an adversarial loss associated with the face anonymization neural network; and
    modifying parameters of the face anonymization neural network based on the perceptual loss and the adversarial loss.

8. A system comprising:
    one or more memory devices storing a face anonymization neural network and a digital image depicting a face of a person; and
    one or more processors configured to cause the system to anonymize the digital image depicting the face of the person by:
        encoding, from the digital image depicting the face of the person utilizing the face anonymization neural network, a face anonymization guide utilizing the face anonymization neural network comprising a face attribute encoder and a texture encoder to:
            extract, utilizing the face attribute encoder, a first set of features representing one or more of gender, ethnicity, or age associated with the face in the digital image;
            extract, utilizing the texture encoder, a second set of features representing image texture of the digital image; and
            combine the first set of features and the second set of features into the face anonymization guide;
        generating a masked digital image from the digital image by masking face pixels for the face depicted in the digital image;
        generating, from the masked digital image and utilizing a decoder of the face anonymization neural network, an anonymized digital image by replacing the face pixels masked in the digital image with synthetic face pixels synthesized according to the face anonymization guide, wherein generating the anonymized digital image comprises:
            extracting a masked image vector from the masked digital image; and
            combining the masked image vector and the face anonymization guide utilizing the face anonymization neural network.

9. The system of claim 8, wherein extracting the first set of features further comprises utilizing the face attribute encoder of the face anonymization neural network to extract features representing expression for the face in the digital image.

10. The system of claim 9, wherein utilizing the face attribute encoder of the face anonymization neural network to extract features representing expression comprises:
    identifying, utilizing the face attribute encoder, one or more expressions for the face in the digital image; and
    generating, utilizing the face attribute encoder, an intensity value corresponding to the one or more expressions for the face in the digital image.

11. The system of claim 8, wherein generating the anonymized digital image comprises:
    combining the masked image vector and the face anonymization guide to generate a combined image mask-feature guide vector; and
    generating the anonymized digital image utilizing the decoder of the face anonymization neural network from the combined image mask-feature guide vector.

12. The system of claim 8, wherein generating the masked digital image comprises:
    detecting an additional face depicted in the digital image in addition to the face of the person;
    removing pixels of the additional face to remove the additional face from a boundary around the face depicted in the digital image; and
    masking the face pixels for the face depicted within the boundary.

13. The system of claim 8, wherein the one or more processors are further configured to cause the system to anonymize the digital image depicting the face of the person by:
    determining an adversarial loss associated with the face anonymization neural network; and
    modifying parameters of the face anonymization neural network based on the adversarial loss.

14. The system of claim 13, wherein determining the adversarial loss associated with the face anonymization neural network comprises:
    generating a modified stored digital image by adjusting a yaw of a face depicted within a stored digital image;
    generating a realism prediction for the anonymized digital image relative to the modified stored digital image utilizing a discriminator associated with the face anonymization neural network; and
    determining the adversarial loss associated with the face anonymization neural network based on the realism prediction.

15. A computer-implemented method comprising:
    encoding, from a digital image depicting a face of a person, a face anonymization guide utilizing a face anonymization neural network comprising a face attribute encoder and a texture encoder to:
        extract, utilizing the face attribute encoder, a first set of features representing one or more of gender, ethnicity, or age associated with the face in the digital image;
        extract, utilizing the texture encoder, a second set of features representing image texture of the digital image; and
        combine the first set of features and the second set of features into the face anonymization guide;
    generating a masked digital image from the digital image by masking face pixels for the face depicted in the digital image; and
    generating, from the masked digital image and utilizing a decoder of the face anonymization neural network, an anonymized digital image by replacing the face pixels masked in the digital image with synthetic face pixels synthesized according to the face anonymization guide, wherein generating the anonymized digital image comprises:
        extracting a masked image vector from the masked digital image; and combining the masked image vector and the face anonymization guide utilizing the face anonymization neural network.

16. The computer-implemented method of claim 15, wherein encoding the face anonymization guide comprises generating a feature vector representing gender, ethnicity, age, and expression for the face in the digital image.

17. The computer-implemented method of claim 15, wherein encoding the face anonymization guide comprises generating a feature vector representing image texture for the face in the digital image.

18. The computer-implemented method of claim 15, wherein generating the masked digital image comprises:
   detecting an additional face depicted in the digital image in addition to the face of the person;
   removing pixel values for pixels of the additional face in the digital image;
   generating a boundary for the face depicted in the digital image including pixels with removed pixel values for the additional face; and
   masking the face pixels for the face depicted within the boundary.

19. The computer-implemented method of claim 15, wherein generating the anonymized digital image comprises:
   extracting the masked image vector from the masked digital image utilizing an encoder of the face anonymization neural network;
   generating a mapped noise vector by extracting features from a noise vector utilizing a mapper associated with the face anonymization neural network; and
   synthesizing the synthetic face pixels from the face anonymization guide, the masked image vector, and the mapped noise vector utilizing the decoder of the face anonymization neural network.

20. The computer-implemented method of claim 19, further comprising:
   determining, based on the synthetic face pixels, a perceptual loss and an adversarial loss associated with the face anonymization neural network; and
   modifying parameters of the face anonymization neural network to reduce the perceptual loss and the adversarial loss.

* * * * *